United States Patent [19]
Cox et al.

[11] Patent Number: 5,935,177
[45] Date of Patent: Aug. 10, 1999

[54] PILOT-INDUCED OSCILLATION DETECTION AND COMPENSATION APPARATUS AND METHOD

[75] Inventors: Chadwick J. Cox; Carl E. Lewis, both of Chattanooga, Tenn.

[73] Assignee: Accurate Automation Corporation, Chattanooga, Tenn.

[21] Appl. No.: 08/795,105

[22] Filed: Feb. 6, 1997

[51] Int. Cl.[6] ............................. G05D 01/08; G06F 07/60; G06G 07/78

[52] U.S. Cl. ................................. 701/9; 701/6; 244/178; 244/181; 244/195

[58] Field of Search .................................. 244/17.3, 228, 244/178, 181, 195; 701/5, 6, 8, 9

[56] References Cited

U.S. PATENT DOCUMENTS

| | | | |
|---|---|---|---|
| 3,412,299 | 11/1968 | Buscher et al. | 244/195 |
| 3,704,843 | 12/1972 | Jenny | 244/85 |
| 4,298,833 | 11/1981 | Edwards et al. | 318/561 |
| 4,330,829 | 5/1982 | Fischer et al. | 244/17.13 |
| 4,741,501 | 5/1988 | Clelford et al. | 244/17.13 |
| 5,136,518 | 8/1992 | Glover | 244/181 |
| 5,402,521 | 3/1995 | Niida et al. | 395/22 |
| 5,410,477 | 4/1995 | Ishii et al. | 364/424.01 |
| 5,434,783 | 7/1995 | Pal et al. | 364/424.05 |
| 5,483,446 | 1/1996 | Momose et al. | 364/424.01 |
| 5,493,631 | 2/1996 | Huang et al. | 395/22 |
| 5,528,119 | 6/1996 | Rundqwist et al. | 701/4 |
| 5,722,620 | 3/1998 | Najmabadi et al. | 244/195 |

*Primary Examiner*—Verna Lissi Mojica
*Attorney, Agent, or Firm*—Jon M. Jurgovan

[57] ABSTRACT

The apparatus of this invention includes a pilot-induced oscillation (PIO) detector, a PIO compensator and a pilot input modifier. The PIO detector is coupled to receive aircraft state signal including the aircraft's pitch, roll and yaw attitudes. The PIO detector is also coupled to receive pilot control signal generated by the aircraft's pilot by manipulation of flight control instruments. Preferably, the PIO detector includes a feature calculator and a discriminator. Based on the aircraft state signal and the pilot control signal, the feature calculator generates at least one feature signal indicative of whether a PIO or non-PIO condition exists in the aircraft. The feature calculator supplies the feature signal to the discriminator, that uses the feature signal to determine whether or not a PIO condition exists. The discriminator preferably uses a discrimination function determined by a neural network trained to discriminate PIO and non-PIO conditions, to generate the PIO indicator signal based on the feature signal(s). The discriminator generates the PIO indicator signal that indicates the likelihood of the existence of a PIO condition in the aircraft. The PIO indicator signal can be coupled to an audio and/or visual alarm to warn the pilot that the pilot's control actions are driving the PIO condition. The PIO compensator is coupled to receive the PIO indicator signal, and generates the compensation signal using the PIO indicator signal. The PIO compensator is coupled to output the PIO compensation signal to a pilot input modifier. In addition to the compensation signal, the pilot input modifier receives and modifies the pilot control signal, based on the compensation signal. The pilot input modifier can accomplish appropriate modification through gain attenuation or phase shift of the pilot control signal. The modified pilot control signal is used to control the aircraft's flight control actuators to eliminate the PIO condition. Accordingly, the invented apparatus prevents aircraft damage or pilot injury or death, that could otherwise result from a PIO condition. The invention also includes a related method.

54 Claims, 15 Drawing Sheets

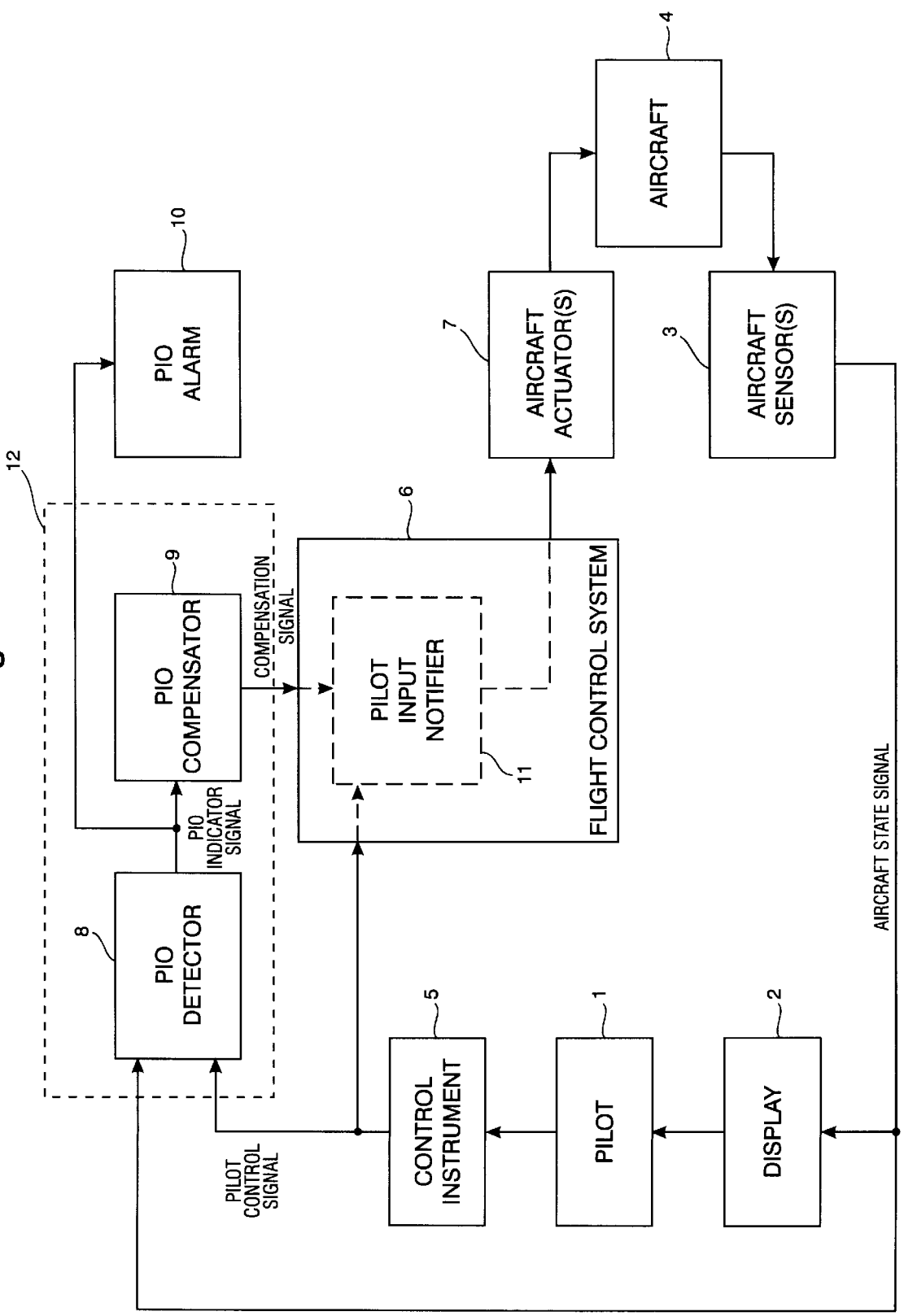

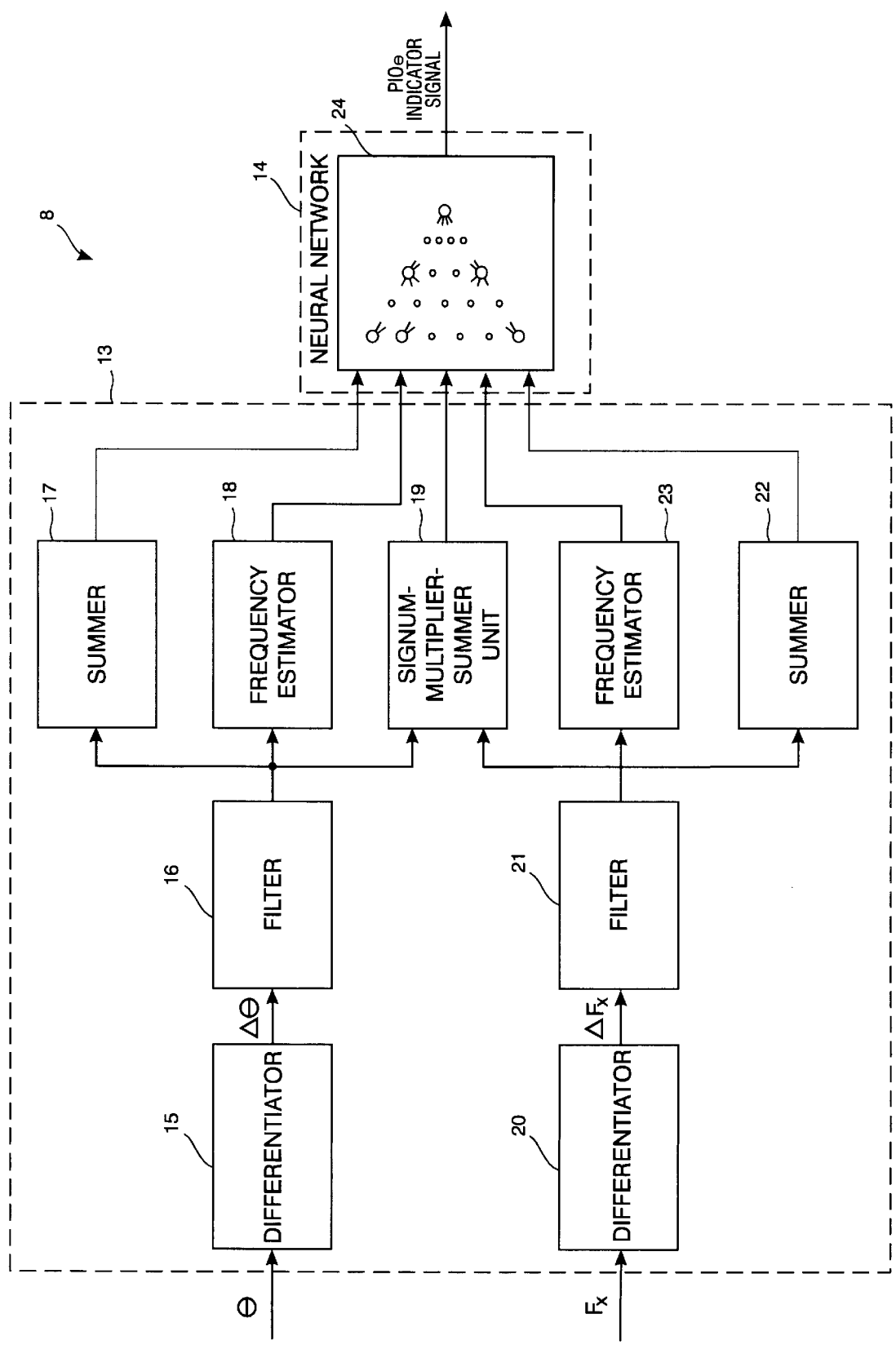

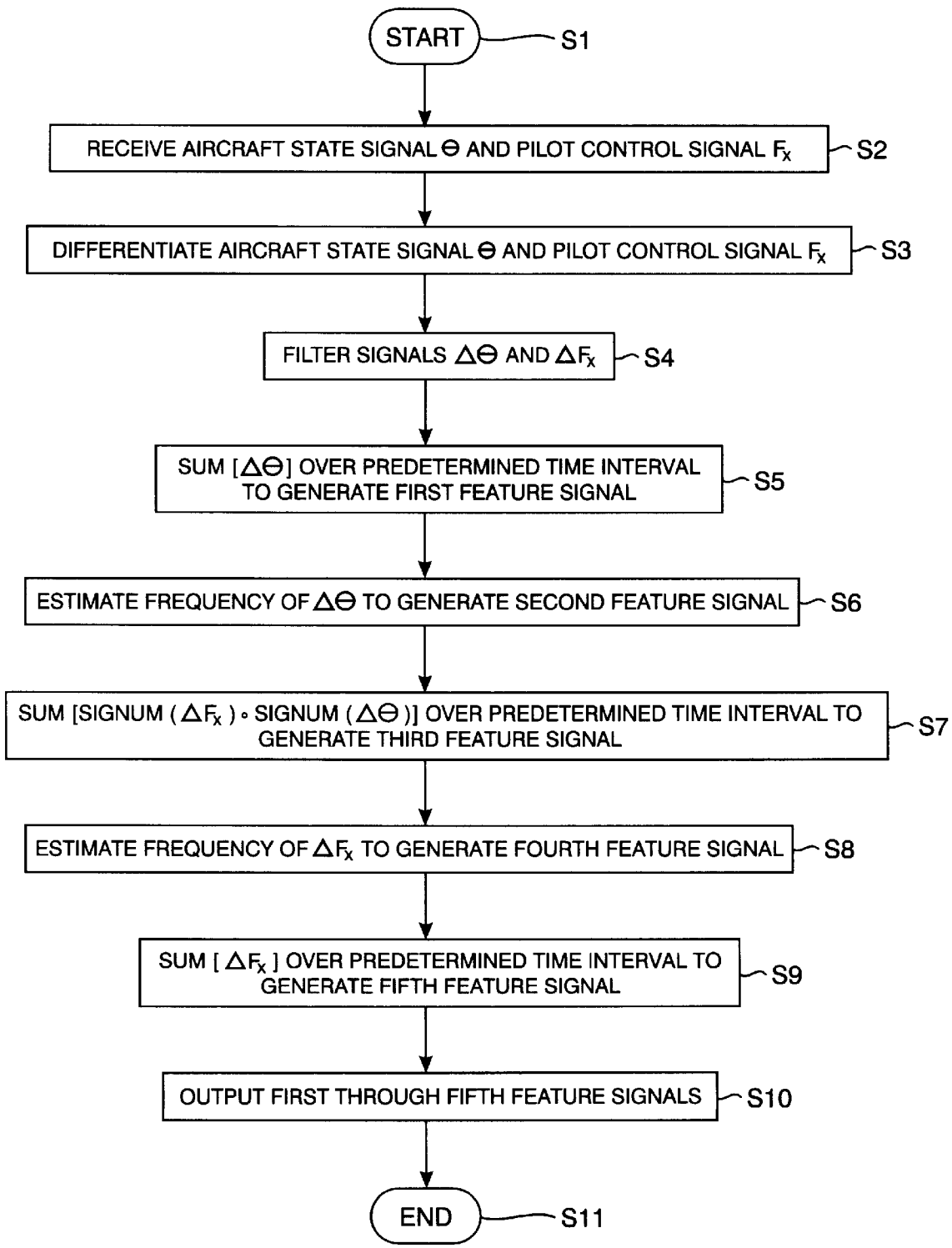

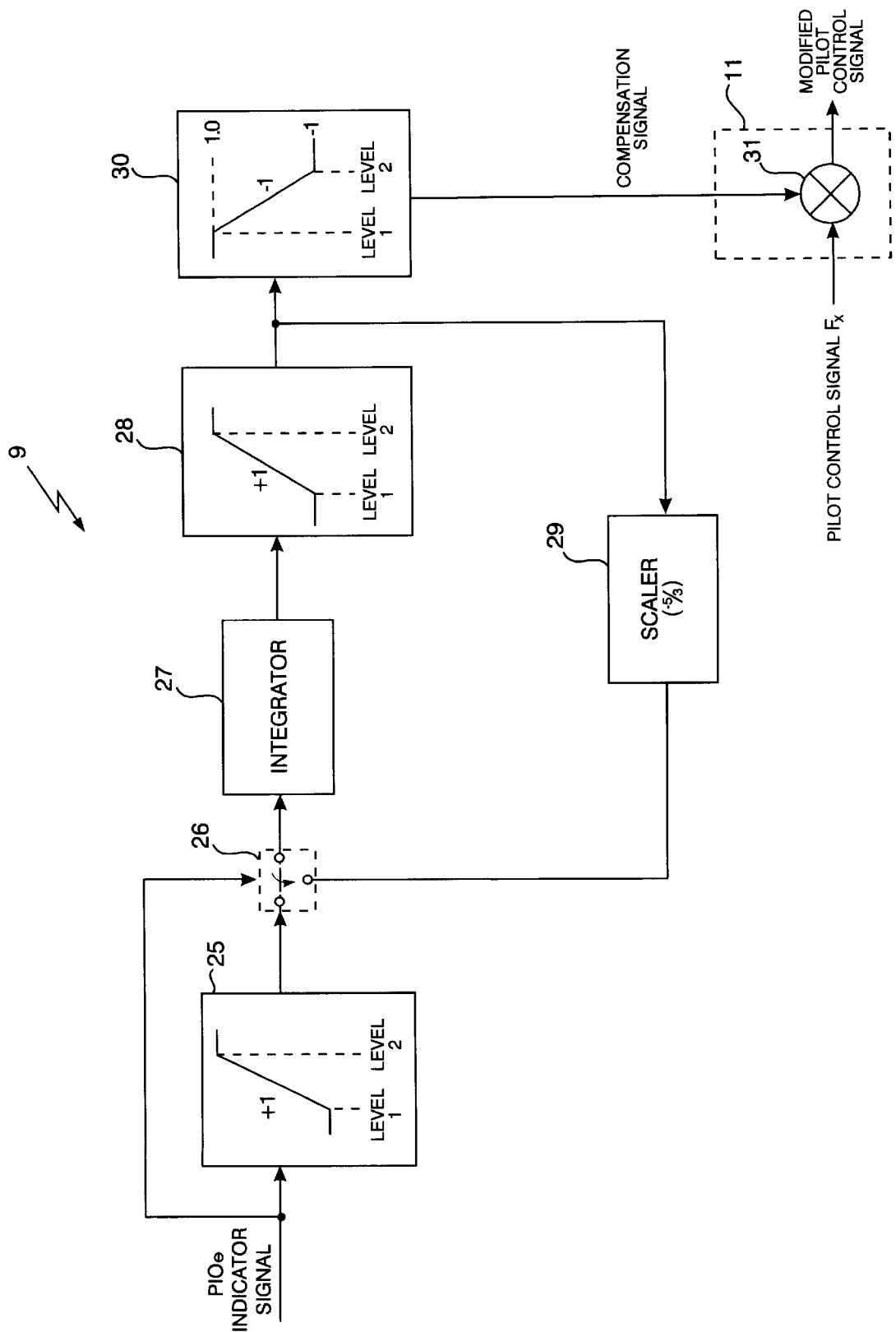

PILOT-INDUCED OSCILLATION DETECTION AND COMPENSATION APPARATUS AND METHOD

STATEMENT OF GOVERNMENT RIGHTS IN THE INVENTION

This invention was developed under a Small Business Innovative Research project funded by the U.S. Government as represented by the Department of the Air Force under Contract No. F33615-95-C-2540. The U.S. Government has certain rights in the invention.

BACKGROUND OF THE INVENTION

1. Field of the Invention

This invention is directed to an apparatus and method for detecting pilot-induced oscillations (PIOs), and for controlling the pilot's input to the aircraft's flight control system to eliminate the PIO.

2. Description of the Related Art

Pilot-induced oscillations (PIOs) have long been recognized as a significant aircraft safety problem. A PIO results from undesirable interaction between a pilot and an aircraft, that drives the aircraft into control instability. PIOs have occurred in a large variety of civilian and military aircraft, and aviation history is replete with incidents in which the occurrence of a PIO resulted in aircraft damage or destruction, or pilot injury or death. For example, PIOs have been responsible for many aircraft accidents including crashes of the X-15, M2-F2 and the YF-22, and near-disasters involving the U.S. space shuttle, the Soviet Buran shuttle and the YF-16.

In an effort to prevent PIOs from ever arising, aircraft are stringently designed and tested under a variety of conditions. Nonetheless, even with such intensive design and test efforts, aircraft and/or pilot behavior can lead to PIOs and resulting disasters, as evidenced by the above-noted aircraft accidents. It would therefore be highly desirable to be able to stop PIOs at their onset before they become so serious as to result in an accident.

SUMMARY OF THE INVENTION

This invention overcomes the above-noted disadvantages. An apparatus in accordance with this invention detects, and preferably also compensates for, a PIO condition. The apparatus receives an aircraft state signal and a pilot control signal. The aircraft state signal can include pitch, roll or yaw attitude signals sensed by respective sensors of the aircraft, and the pilot control signal can include longitudinal stick, lateral stick, and rudder signals as set by the pilot. The invented apparatus includes a pilot-induced oscillation (PIO) detector that is coupled to receive the aircraft state signal and the pilot control signal. The PIO detector includes a feature calculator that receives the aircraft state signal and the pilot control signal, and uses these signals to generate at least one feature signal, and preferably several feature signals, that are indicative of whether or not a PIO condition exists or is imminent.

In a first embodiment of the feature calculator, the feature signal(s) can include a sum of absolute values of changes in the aircraft state signal for respective time increments, determined over a predetermined time interval. The feature signal(s) can also include a frequency estimate of the aircraft state signal that is determined based on the number of times that the changes of the aircraft state signal pass through a predetermined amplitude level (that is preferably equal to zero) during a predetermined time interval. Further, the feature signal(s) can include a sum of absolute values of changes in pilot control signal for respective time increments, determined over a predetermined time interval. In addition, the feature signal(s) can include a frequency estimate of the pilot control signal that is determined based on the number of times that the changes in the pilot control signal pass through a predetermined level (preferably equal to zero) during a predetermined time interval. Moreover, the feature signal(s) can include a sum of products of the signum of changes in the aircraft state signal and the signum of changes in pilot control signal over respective time increments, added over a predetermined time interval.

In a second embodiment of the feature calculator, the feature calculator is coupled to receive the aircraft state signal and the pilot control signal, and conditions and performs a fast Fourier transform (FFT) on these signals to generate magnitude, phase and frequency components of the aircraft state signal and the pilot control signal. The feature calculator determines a predetermined number of maxima of the magnitudes of the frequency components of each of the aircraft state signal and the pilot control signal. The feature calculator further determines whether any of the frequency components of the aircraft state signal and the pilot control signal occur at similar frequencies. If none of the maxima of the aircraft state signal occur at the same or similar frequency to the maxima of the pilot control signal, the feature calculator outputs feature signals with zero values to indicate that no PIO condition exists. On the other hand, if one or more corresponding pairs of maxima of the magnitudes of the frequency components of the aircraft state signal and the pilot control signal have the same or similar frequency, the feature calculator determines which of the corresponding pairs of maxima have the largest phase difference. For the pair of maxima with the largest phase difference, the feature calculator outputs the magnitudes of the frequency components, the average frequency and the phase difference as feature signals.

In a third embodiment of the feature calculator, the feature calculator is coupled to receive the aircraft state signal and the pilot control signal. The feature calculator is programmed with a predetermined polynomial that approximates a sine function used to represent one or both of the aircraft state signal and the pilot control signal. The feature calculator determines the amplitude of the aircraft state signal by determining maxima and/or minima of samples of the aircraft state signal. The feature calculator uses the determined amplitude of the aircraft state signal to normalize a set of samples of the aircraft state signal. Predetermined equations determined based on a Fourier series expansion of a sine function, relate polynomial coefficients to phase and frequency of the signal represented by the polynomial. The feature calculator fits the polynomial function to the aircraft state signal, and solves simultaneous equations to determine the phase and frequency of the aircraft state signal. Similarly, the feature calculator determines the amplitude of the pilot control signal by determining the maxima and/or minima of the pilot control signal. The feature calculator normalizes the pilot control signal with the amplitude, and fits the polynomial to the pilot control signal. The feature calculator solves simultaneous equations to determine the phase and frequency of the pilot control signal. The feature calculator determines the average frequency of the aircraft state signal and the pilot control signal, and the phase difference between the aircraft state signal and the pilot control signal. The feature calculator outputs the average frequency, phase difference and amplitudes of the aircraft state signal and the pilot control signal, as feature signals.

A fourth embodiment of the feature calculator uses a function minimization technique to determine feature signals based on the aircraft state signal and the pilot control signal. For use in the first iteration of the technique, the feature calculator is preferably preprogrammed with a set of estimates of the amplitude, frequency and phase that define a sine function representing the aircraft state signal. In subsequent iterations, the feature calculator preferably uses the set of amplitude, frequency and phase estimates generated by the immediately previous iteration, as estimates for the sine function in the next iteration. The feature calculator is coupled to receive samples of the aircraft state signal, and calculates and stores the error between the sine function defined by a set of amplitude, frequency and phase estimates, and the aircraft state signal samples over a predetermined time window or interval, preferably of two seconds, for one iteration of the technique. The feature calculator preferably stores the set of amplitude, frequency and phase in correspondence with the error that such set generated. At the conclusion of the iteration, the feature calculator modifies the amplitude, frequency and phase according to a standard minimization technique. In the preferred embodiment, the feature calculator uses the simplex method of function minimization, and the function being minimized is the squared approximation error of the samples of the aircraft state signal relative to the sine function defined by a set of amplitude, frequency and phase, that represents the aircraft state signal. The feature calculator repeats the modification of the amplitude, frequency and/or phase estimates using the minimization technique, to generate different sets of estimates for successive iterations, generally reducing the approximation error with each iteration. If the feature calculator determines that a set yields an error that is less than a predetermined error level, the feature calculator designates such set as the solution set for the current time window or interval, of the technique. Alternatively, if a predetermined number of iterations have been performed without obtaining a set that generates an error less than the predetermined error level, the feature calculator designates the solution set for the current time window as the set of amplitude, frequency and phase that yields the smallest error relative to the samples of the aircraft state signal. Similarly, for the pilot control signal, the feature calculator is preprogrammed with a set of estimates of the amplitude, frequency and phase of a sine function representing the pilot control signal for use in the first iteration of the function minimization technique, and in subsequent iterations, the feature calculator uses the immediately previous iteration's set of amplitude, frequency and phase estimates to perform the technique. The feature calculator is coupled to receive a time window or interval of samples of the pilot control signal, and determines an error between a sine function represented by the estimated amplitude, frequency and phase, and the samples of the pilot control signal. The feature calculator stores the calculated error in correspondence with the estimated amplitude, frequency and phase set of the sine function that generated the error. The feature calculator uses the function minimization technique to modify the current iteration's amplitude, frequency and phase of the sine function representing the pilot control signal, to generate a set for the next iteration. The feature calculator repeats the modification of the amplitude, frequency and/or phase using the technique to generate different sets, generally reducing the error with each successive iteration until the error is below a predetermined acceptable level. The feature calculator designates the amplitude, frequency and phase set that generates the error below the predetermined level, as the solution set. Alternatively, the feature calculator determines whether the number of iterations of the technique that have been performed, exceeds a predetermined number. If so, the feature calculator designates the set that generates the smallest error as the solution set for the sine function representing the pilot control signal. The feature calculator uses the amplitudes, phases and frequencies that yield the smallest errors for each of the aircraft state signal and the pilot control signal to calculate the average frequency of the aircraft state signal and pilot control signal, and the phase difference between the aircraft state signal and the pilot control signal. The feature calculator outputs the average frequency, phase difference and amplitudes of the aircraft state signal and pilot control signal, as feature signals.

Preferably, the PIO detector includes a discriminator that is coupled to receive the feature signals, and that generates and outputs the PIO indicator signal based on the feature signals. The discriminator can be implemented as a neural network to which at least one, and preferably all, of the aforementioned feature signals for either the first or second embodiment of the feature calculator, are input in its operational mode. Before use in its operational mode, however, the neural network is trained to discriminate between PIO and non-PIO conditions using feature signals calculated from the aircraft state signal and pilot control signal from actual or simulated aircraft test data in which a PIO occurred, and an estimate made by a person, for example, of non-PIO and PIO conditions occurring in the aircraft state signal and the pilot control signal for the PIO data. The neural network automatically generates a discrimination function that generates the PIO indicator signal based on the feature signals determined from the PIO data. In its operational mode after training, the neural network receives the feature signals from either the first or second embodiment of the feature calculator as they are calculated in real-time, and generates a PIO indicator signal to indicate whether or not a PIO condition exists, based on the feature signals.

The apparatus can include a PIO alarm unit coupled to receive the PIO indicator signal and situated in the aircraft's cockpit, that, based on the PIO indicator signal, generates a visual or audio indication of the existence of a PIO condition to the pilot. The pilot can thus be alerted that the pilot's control actions are driving the aircraft into control instability.

The apparatus also includes a PIO compensator coupled to receive the PIO indicator signal from the PIO detector, that generates a compensation signal based on the PIO indicator signal. The compensation signal is used to compensate for and eliminate the PIO condition. In the preferred embodiment, the PIO compensator includes at least a switch and an integrator, and preferably also a scaler and several limiters. The switch is coupled to receive the PIO indicator signal from the detector, preferably after scaling by a first limiter with a positive scaling slope, that is coupled between the switch's input and the output of the PIO detector. The switch has an output coupled to the integrator. If the switch couples the PIO indicator signal to the integrator, the integrator integrates such signal to generate an integrated PIO indicator signal. Preferably, a second limiter with a positive scaling slope is coupled to receive the integrated PIO indicator signal from the integrator, and outputs a scaled version of the integrated PIO indicator signal. A third limiter with a negative scaling slope, is coupled to receive the signal from the output of the second limiter, and outputs the twice-scaled, integrated PIO indicator signal as the compensation signal. The output of the second limiter is also coupled to supply the scaled, integrated PIO indicator signal to the scaler that multiplies the signal from the second limiter by a predetermined negative value to generate an output signal. The output signal generated by the scaler is coupled to an input terminal of the switch. The switch is coupled to receive the PIO indicator signal at its control input. When the PIO indicator signal is greater than or equal to a predetermined switch level, the switch couples the output of the first limiter to the input of the integrator and decouples the output of the scaler from the input of the integrator. Accordingly, the scaled PIO indicator signal from the first limiter is supplied via the switch to the input of the integrator. On the other hand, if the PIO indicator received at the switch's control input is less than the predetermined switch level, the switch couples the output of the scaler to the input of the integrator and decouples the output of the first limiter from the input of the integrator. The signal output from the scaler is thus supplied to the input of the integrator.

The apparatus also includes a pilot input modifier, preferably included in the flight control system, that is coupled to receive the compensation signal from the PIO compensator, and the pilot control signal from the pilot's joystick or pedal control actions. The pilot input modifier modifies the pilot control signal to reduce its gain or shift its phase to eliminate the PIO condition. The gain modification or reduction can be implemented broadly over a wide range of frequencies of the pilot control signal, or can be implemented in a relatively narrow window of frequencies about the PIO frequency by use of a notch filter with a notch attenuation that is based on the compensation signal, or alternatively that is activated to filter the pilot control signal based on the compensation signal. The shift in phase to affect modification of the pilot control signal to eliminate the PIO condition can also be performed at one or more frequency components of the pilot control signal. Because a PIO is caused by the pilot's control actions undesirably coupling with the aircraft's control responses to produce oscillations, limiting the gain or shifting the phase of the pilot's control input to the aircraft by a sufficient amount eliminates the PIO condition. The modified pilot control signal is output from the pilot input modifier to control an aircraft actuator that in turn controls the aircraft to eliminate the PIO condition.

A method in accordance with this invention includes a step of generating pilot-induced oscillation (PIO) indicator signal indicative of whether a PIO condition exists in an aircraft, based on an aircraft state signal and a pilot control signal. The step of generating the PIO indicator signal can include a substep of calculating feature signal indicative of a PIO condition, based on the aircraft state signal and the pilot control signal, and a substep of supplying the feature signal to a discriminator that generates the PIO indicator signal. The method can also include a step of generating an alarm, based on the PIO indicator signal. Further, the method can include a step of generating at least one compensation signal, based on the PIO indicator signal, and a step of modifying gain or phase of the pilot control signal supplied to the aircraft's flight control system to reduce the PIO condition, based on the compensation signal.

Advantageously, the apparatus and method of this invention rapidly detect the onset or existence of a PIO condition in an aircraft, and quickly modify the pilot's control of the aircraft to eliminate the PIO condition. The apparatus and method of this invention can thus prevent aircraft damage or pilot injury or death, or damage to persons or property caused by crash impact of the aircraft. Also, the apparatus and method of this invention can generate an alarm signal to alert the pilot that the pilot's control actions are driving the PIO condition.

These together with other features and advantages, which will become subsequently apparent, reside in the details of construction and operation as more fully hereinafter described and claimed, reference being made to the accompanying drawings, forming a part hereof, wherein like numerals refer to like parts throughout the several views.

BRIEF DESCRIPTION OF THE DRAWINGS

FIG. 1 is a block diagram of a system that includes an apparatus in accordance with this invention;

FIG. 2 is a block diagram of a PIO detector of the invented apparatus that includes a first embodiment of a feature calculator;

FIG. 3 is a flow chart of processing performed by a processor used to implement a feature calculator in a variation of its first embodiment;

FIG. 7 is a block diagram of a PIO compensator and a pilot input modifier in accordance with the invented apparatus;

DESCRIPTION OF THE PREFERRED EMBODIMENTS

Figure 4A:
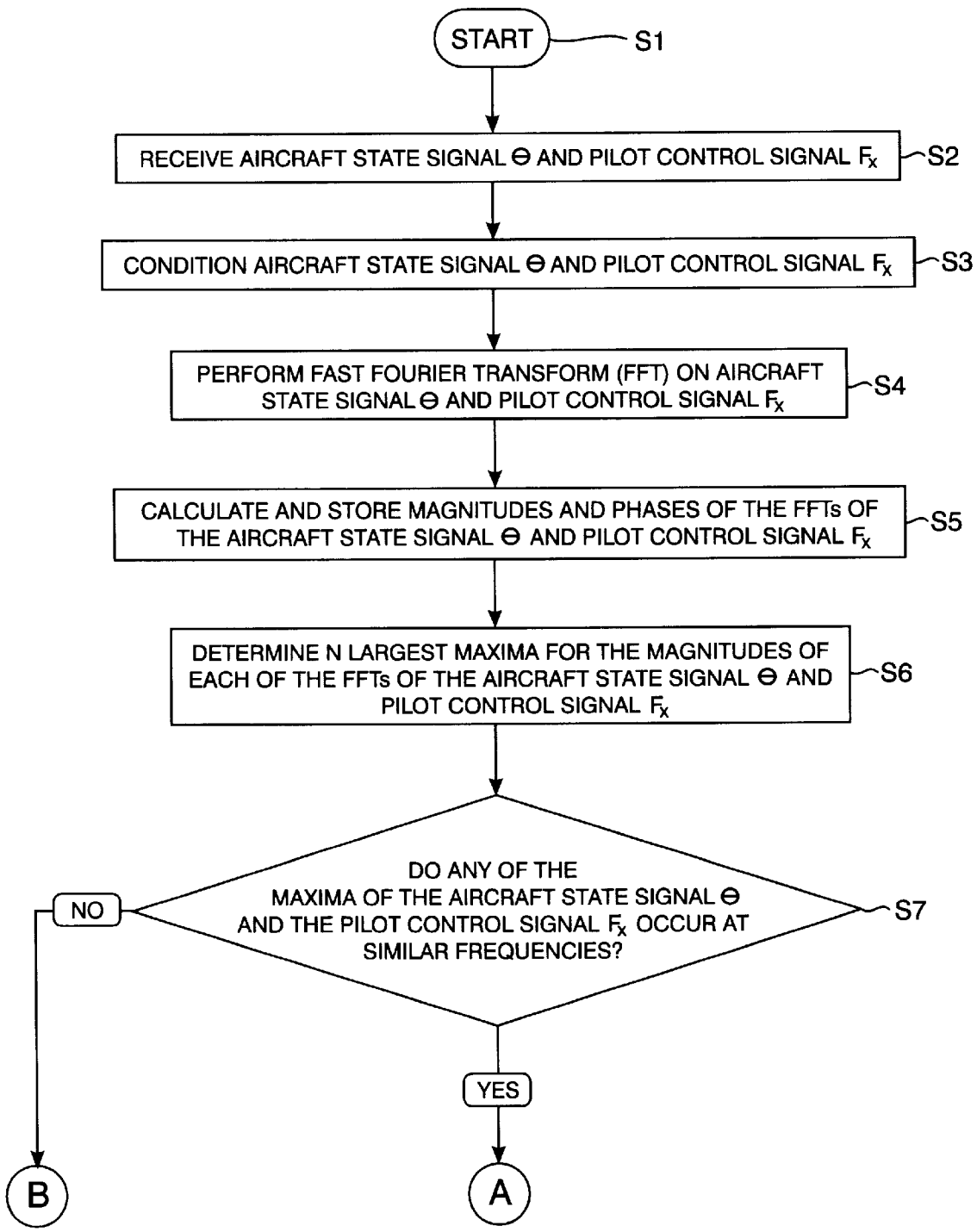
FIGS. 4A and 4B are flow charts of processing performed by a processor to implement a second embodiment of the feature calculator that can be used in the PIO detector.

FIG. 1 is a block diagram of a portion of an aircraft system that is relevant to the subject invention. A pilot 1 is situated to view a display 2. The display is coupled to one or more sensor(s) 3 of the aircraft 4, and uses an aircraft state signal generated by the sensors to generate visual information regarding aircraft attitude on the display. The aircraft state signal includes one or more of the pitch angle $\theta$, the roll angle $\phi$, and the yaw angle $\psi$ that define the aircraft's attitude. In performing a desired maneuver, the pilot operates aircraft control instruments 5 such as a joystick and pedals, that generate a pilot control signal indicating the pilot's desired flight control actions. In many aircraft, an application of a deflection $\delta_x$ or a force $F_x$ to the pilot's joystick or yoke in the x-axis direction controls the aircraft's pitch attitude, and a deflection $\delta_y$ or a force $F_y$ applied in the y-axis direction controls the aircraft's roll. In most aircraft, the pedal deflection $\delta_r$ either to the right or left from the pilot's perspective, controls the aircraft's yaw attitude. One or more of the pilot's deflections $\delta_x$, $\delta_y$ or deflection force $F_x$, $F_y$, and the pedal deflection $\delta_r$, are referred to herein as the 'pilot control signal.'

The pilot's control instruments are coupled to a flight control system 6 that converts the pilot control signal generated by the control instruments, into a flight control signal. The flight control system is coupled to supply the flight control signal to one or more aircraft actuators 7 that affect flight control actions. For example, the actuators can modify control surfaces of the aircraft 4, such as wing flaps, aerolons or elevators, or can change jet thrust direction, for example, to change the aircraft's direction of flight. The flight control action caused by the actuators controls the state or attitude of the aircraft 4. The state of the aircraft is sensed by aircraft sensor(s) 3. For example, the aircraft sensor(s) 3 can include one or more gyroscopes that output the aircraft state signal indicative of the aircraft's pitch angle $\theta$, roll angle $\phi$, and yaw angle $\psi$.

The apparatus of this invention preferably includes a PIO detector 8, a PIO compensator 9, a PIO alarm 10 and a pilot input modifier 11. The PIO detector 8 is coupled to receive the aircraft state signal and the pilot control signal, and generates a PIO indicator signal indicative of whether or not a PIO condition exists in the aircraft. The PIO detector 8 is coupled to output the PIO indicator signal to the PIO compensator 9. The PIO detector is also coupled to output the PIO indicator signal to the PIO alarm 10 that generates an audio and/or visual indication in the cockpit, for example, to alert the pilot of the existence of a PIO condition. The PIO compensator 9 generates a compensation signal based on the PIO indicator signal, that is used to eliminate the PIO condition. More specifically, the PIO compensator 9 is coupled to a pilot input modifier 11 that is implemented in the flight control system 6. The pilot input modifier 11 modifies the pilot control signal based on the compensation signal, to either affect a phase shift or to reduce the gain of the pilot control signal output to the aircraft actuator(s) 7. The pilot input modifier 11 thus inhibits the pilot's control actions from driving the PIO condition into further instability, and therefore allows the pilot to regain control of the aircraft.

In the preferred embodiment, the PIO detector 8 and the PIO compensator 9 are implemented in a single digital signal processor 12 operating with appropriate programs. Many digital signal processors commercially available within the last five years can be used to implement the PIO detector and the PIO compensator, as will be readily apparent to those of ordinary skill in this technological field. The PIO alarm 10 can be implemented as a blinking light and/or with an audio alarm or buzzer, for example, placed in near vicinity to the pilot. The pilot input modifier 11 is preferably implemented in a processor included in the flight control system with appropriate programming.

In operation, the sensors 3 of the aircraft 4 generate an aircraft state signal supplied to the display 2. The pilot 1 monitors the display 2 that is generated based on the aircraft state signal, and controls the aircraft based on the display and/or the pilot's desired flight actions, using the control instrument 5. The control instruments generate a pilot control signal supplied to the aircraft's flight control system 6. The aircraft flight control system generates a flight control signal supplied to the aircraft actuators 7 to control the aircraft 4. The PIO detector 8 determines whether a PIO condition exists, based on the aircraft state signal and the pilot control signal. If the PIO detector 8 determines that a PIO condition exists, the PIO detector activates the PIO indicator signal supplied to the PIO alarm to generate an audio or visual alarm to alert the pilot that the pilot's control actions are causing a PIO condition. The PIO detector also outputs the PIO indicator signal to the PIO compensator. Based on the PIO indicator signal, the PIO compensator generates a compensation signal supplied to the flight control system. The flight control system modifies the pilot control signal based on the compensation signal, to generate the flight control signal output to the aircraft actuator 7. Preferably, the flight control system includes a pilot input modifier that shifts the phase or reduces the gain, based on the compensation signal, to modify the pilot control signal. The flight control system generates the flight control signal, based on the modified pilot control signal, that controls the aircraft actuators to eliminate the PIO condition. On the other hand, if the PIO detector detects no PIO condition, based on the aircraft state signal and the pilot control signal, the detector deactivates the PIO indicator signal so that the compensator 9 and the alarm 10 are likewise deactivated.

FIG. 2 is a block diagram of a portion of the PIO detector 8 that is used to detect a PIO occurring in the aircraft's pitch angle $\theta$ in an aircraft of a type that is controlled by the pilot's deflection force $F_x$. The apparatus components used to detect PIOs in the other aircraft state signals, namely, the roll angle $\phi$ and the yaw angle $\psi$, controlled with joystick or yoke deflection force $F_y$ and the pedal deflection $\delta_r$, respectively, will be readily understood from the following description of the elements of the apparatus used to detect PIOs in the aircraft's pitch angle $\theta$. In addition, it will be readily apparent to persons of average skill in this technology that elements similar to the components of the PIO detector 8 shown in FIG. 2 can be used to detect PIOs if the aircraft is of a type that is controlled by joystick or yoke deflections $\delta_x$, $\delta_y$ and pedal deflection $\delta_r$.

In FIG. 2, the PIO detector 8 includes a feature calculator 13 and a discriminator 14. The feature calculator 13 is coupled to receive the aircraft state signal (that is the aircraft's pitch angle $\theta$ in FIG. 2) and the pilot control signal (that is the pilot's x-axis deflection force $F_x$ in FIG. 2). Based on the aircraft state signal and the pilot control signal, the feature calculator 13 generates a feature signal(s). The feature calculator 13 is coupled to output the feature signal (s) to the discriminator 14. The discriminator 14 generates the PIO indicator signal(s) indicative of whether a PIO condition exists, based on the feature signal(s).

A first embodiment of the feature calculator 13, shown in FIG. 2, includes a differentiator 15, a filter 16, a summer 17, a frequency estimator 18, and a signum-multiplier-summer unit 19. The differentiator 15 is coupled to receive the aircraft state signal $\theta$, and preferably samples the aircraft state signal periodically at time increments $\Delta t$. The differentiator 15 generates a change signal $\Delta\theta$ in the aircraft state signal over a respective time increment $\Delta t$ (0.1 seconds, for example). The differentiator 15 is coupled to output the change signal $\Delta\theta$ to a filter 16. Preferably, the filter 16 is a finite impulse response (FIR) filter that performs bandpass filtering of the change signal $\Delta\theta$ in a range from 0.2 to 3.0 Hz because PIOs are likely to occur only within this range of frequencies. The filtering thus helps to eliminate false detections of PIOs at frequencies at which a PIO are not likely to occur. The filter 16 is coupled to output the filtered change signal $\Delta\theta$ to a summer 17. The summer 17 adds absolute values of the filtered change signal $\Delta\theta$ over a predetermined time interval (2 seconds, for example) to generate a sum signal. The summer 17 is coupled to output the sum signal to the discriminator 14 as a feature signal.

The filter 16 is also coupled to output the filtered change signal $\Delta\theta$ to the frequency estimator 18. The frequency estimator 18 determines the frequency of the filtered change signal $\Delta\theta$ by counting the number of sign changes occurring in the filtered change signal $\Delta\theta$ over a predetermined time interval. More specifically, the estimator 18 counts time increments $\Delta t$ corresponding to the filtered change signal $\Delta\theta$ and compares the count with a number of time increments corresponding to the predetermined time interval. When the counted number of time increments equals or just exceeds the number of time increments corresponding to the predetermined time interval, the estimator 18 can calculate the frequency of the change signal $\Delta\theta$ by dividing the number of sign changes by two times the predetermined time interval. The estimator 18 is coupled to output the calculated frequency as a feature signal to the discriminator 14. Alternatively, because the predetermined time interval is known in advance, the estimator 18 can merely output to the discriminator 14 the number of sign changes occurring over the predetermined time interval, which is directly proportional to the frequency of the filtered change signal $\Delta\theta$. In this case, the discriminator 14 can be trained to perform proper scaling of the number of sign changes occurring over the predetermined time interval, to properly account for the fact that the number sign changes is not in frequency units. Although it is preferred to count the number of sign changes over a predetermined time interval to generate the frequency, the estimator 18 can of course more generally count the number times that the filtered change signal $\Delta\theta$ passes through a predetermined amplitude level during the time interval (the counting of sign changes is a special case of counting the number times that the filtered change signal $\Delta\theta$ passes through a predetermined amplitude level, in which the amplitude level is zero). The estimator 18 can either output the number times that the filtered change signal $\Delta\theta$ passes through a predetermined amplitude level directly to the discriminator 14 as a feature signal, or can divide the number by twice the predetermined time interval and output the result to the discriminator as a feature signal.

In addition, the filter 16 is coupled to output the filtered change signal $\Delta\theta$, to the unit 19. The operation of the unit 19 will be described later in this document.

The first embodiment of the feature calculator 13 as shown in FIG. 2 also includes a differentiator 20, a filter 21, a summer 22, and a frequency estimator 23. The differentiator 20 is coupled to receive the pilot control signal $F_x$. Preferably, the differentiator 20 samples the pilot control signal $F_x$ periodically at time increments $\Delta t$. The differentiator 20 determines the change in the pilot control signal $\Delta F_x$ over a respective time increment $\Delta t$. A time increment $\Delta t$ of 0.1 seconds yields excellent results, but of course the time increment $\Delta t$ may be predetermined to have a different value, preferably on the order tenths or hundredths of a second. The differentiator 20 is coupled to output the change in pilot control signal $\Delta F_x$ to a filter 21. The filter 21 is preferred to be a finite impulse response (FIR) filter that performs bandpass filtering of the change signal $\Delta F_x$ to eliminate frequency components of the pilot control signal outside the range from 0.2 to 3.0 Hz, for example, that are not likely to drive a PIO condition.

The filter 21 is coupled to output the filtered change signal $\Delta F_x$ to a summer 22 that sums absolute values of the filtered change signal $\Delta F_x$ over a predetermined time interval (2 seconds, for example) to generate a sum signal. Because the change signal $\Delta F_x$ is determined based on periodic sampling of the aircraft state signal $F_x$, a sum of a predetermined number of the most recently calculated values of the change signal $\Delta F_x$ that corresponds in duration to the predetermined time interval, will yield the desired sum signal. The summer 22 is coupled to output the sum signal as a feature signal to the discriminator 14.

The filter 21 is coupled to output the filtered change signal $\Delta F_x$, to the frequency estimator 23. The frequency estimator 23 determines the number of sign changes occurring in the filtered change signal $\Delta F_x$ over a predetermined time interval, preferably 2.0 seconds. By dividing the counted number of sign changes by twice the predetermined time interval, the estimator 23 can determine and output a frequency signal indicative of the frequency of the pilot control signal in Hertz units. The estimator 23 is coupled to output the frequency signal as feature signal to the discriminator 14. Alternatively, the estimator 23 can simply output the number of sign changes occurring over a predetermined number of time increments $\Delta t$ corresponding to the predetermined time interval if the discriminator 14 is trained appropriately to receive as an input the number of sign changes for use in generating the PIO indicator signal. As another alternative, the estimator 23 can more generally be adapted to count the number of times that the filtered change signal $\Delta F_x$ passes through a predetermined amplitude level, which number is either output directly to the discriminator 14 as a feature signal or divided by twice the predetermined time interval, and output to the discriminator 14 as a feature signal.

The filters 16, 21 are coupled to output respective filtered change signal $\Delta\theta$, $\Delta F_x$ to the unit 19. The unit 19 performs respective signum operations on each of the filtered change signal $\Delta\theta$, $\Delta F_x$. A signum function has an output variable that is positive one ("+1") if the input variable, in this case $\Delta\theta$ or $\Delta F_x$, is greater than or equal to zero, and is minus one ("−1") if the input variable is less than zero. The unit 19 multiples the signums of the change signal $\Delta\theta$, $\Delta F_x$ for corresponding time increments $\Delta t$ occurring over the predetermined time interval (preferably 2 seconds), and outputs the resulting sum signal as a feature signal to the discriminator 14. Although all of the feature signals calculated by the summers 17, 22, the estimators 18, 23, and the unit 19 have proven to be highly indicative of PIO conditions, the feature signal generated by the unit 19 has proven to be an especially strong indicator of the existence or absence of a PIO condition. In general, the more negative the value of the feature signal output by the unit 19, the more likely the existence of a PIO condition in the aircraft.

The discriminator 14 is coupled to receive the feature signals generated by the feature calculator 13. Preferably, the discriminator 14 includes a neural network 24 coupled to receive the respective feature signals generated by the summers 17, 22, the estimators 18, 23 and the unit 19. Based on the feature signals, the neural network generates a PIO indicator signal indicative of whether a PIO condition exists in the aircraft. In the case of FIG. 2, the PIO indicator signal is designated 'PIO$_\theta$ indicator signal,' the '$\theta$' subscript indicating that the signal pertains to a PIO condition in the pitch angle $\theta$ attitude of the aircraft.

The neural network 24 can be one of a variety of different types of neural networks, including a multilayer perceptron. In its training mode, the neural network is trained by inputting sets of training feature signals and corresponding training PIO indicator signals. Preferably, the training sets of feature signals and PIO indicator signals are obtained from in-flight recordings of actual PIOs, and a person's judgment as to when the PIO condition exists. Usually, the PIO condition is adjudged to begin when the pilot control signal and the aircraft state are out of phase for one full cycle of the PIO, and is adjudged to persist as long as the pilot control signal and the aircraft state signal continue to be out of phase. Alternatively, the training sets can be derived from simulated PIOs. As well understood by those of average skill in this technological field, the training sets are input to the neural network 24 and, using back-propagation for example, the connection weights of the neural network are adjusted so that the network can discriminate between PIO and non-PIO conditions based on the feature signals. Upon completion of its training mode, the neural network 24 is prepared for its operational mode during actual aircraft flight, to generate a PIO indicator signal indicative of whether or not a PIO condition exists in flight.

Although the detector 8 of FIG. 2 is configured to detect PIOs in the pitch angle θ attitude of the aircraft, the detector 8 can readily be modified to detect PIOs in other attitudes. For example, in FIG. 2, if θ, $F_x$, Δθ, $\Delta F_x$ are replaced with φ, $F_y$, Δφ, $\Delta F_y$, respectively, the detector 8 has a form suitable to detect PIOs occurring in the aircraft's roll attitude. Similarly, in FIG. 2, if θ, $F_x$, Δθ, $\Delta F_x$ are replaced with ψ, $\delta_r$, Δψ, $\Delta \delta_r$, respectively, the detector 8 has a form suitable to detect PIOs occurring the aircraft's yaw attitude. If the aircraft is of a type in which the pilot's x- and y-axis deflections (and not the deflection force) control the aircraft, θ, $F_x$, Δθ, $\Delta F_x$ in FIG. 2 can be replaced with θ, $\delta_x$, Δθ, $\Delta \delta_x$, or φ, $\delta_y$, Δφ, $\Delta \delta_y$ or ψ, $\delta_r$, Δψ, $\Delta \delta_r$, for the pitch, roll and yaw aircraft attitudes, to generate a $PIO_\theta$ indicator signal, a $PIO_\phi$ indicator signal and a $PIO_\psi$ indicator signal, respectively. The roll or yaw feature signals can be generated by the feature calculator as described with reference to FIG. 2 for the pitch feature signals. For the roll or yaw attitudes, the discriminator 14 is trained or programmed to generate and output the $PIO_\phi$ indicator signal or the $PIO_\psi$ indicator signal to indicate whether a PIO condition exists in the aircraft's roll or yaw attitudes, based on the roll or yaw feature signals generated by the feature calculator. For the roll and yaw attitudes, the discriminator can be implemented as a neural network trained to generate the with data from actual or simulated roll or yaw PIOs. The versatility of the invented apparatus to detect PIOs in the pitch, roll or yaw attitudes of different aircraft types should now be readily apparent. Moreover, the components of the detector 8 shown in FIG. 2 can be implemented by appropriate programs in a single, reasonably advanced digital signal processor with a modest amount of memory (8 or 16 kilobytes, for example). Of course, the components of the detector 8 of FIG. 2 or the above-described variations thereof can be implemented with discrete digital or analog devices, a programmable logic array, a microcontroller, or a processor coupled to a memory, or the like, without departing from the scope of this invention. Also, the components of the detector 8 can be implemented in the aircraft's flight control system 6 without the use of the processor 12, if sufficient processing capacity is available in the system 6.

It should be noted that although the discriminator 14 preferably includes a neural network 24, the neural network can, if desired, be substituted with an appropriate unit after the network is used to prepare a discrimination function that maps values of the feature signals to corresponding values of the PIO indicator signal by training the network. For example, the neural network can be replaced with a memory (not shown) storing a look-up table, that is coupled between the feature calculator 13 and the PIO compensator 9. The look-up table can be programmed to implement the discrimination function so that, based on the feature signal(s) supplied to the look-up table from the feature calculator 13, the memory generates and outputs the PIO indicator signal from the look-up table.

Although the components of the feature calculator 13 as shown in FIG. 2 include discrete components, it is also possible to generate the feature signals with a processor (not shown) coupled to receive the aircraft state signal(s) and the pilot control signal(s), and coupled to output the feature signal(s) generated by the processor, to the discriminator 14. The processor can be coupled to a memory (not shown) that is used to store samples of the aircraft state signal and pilot control signal, temporary data used to generate the feature signals, as well as the feature signals themselves. Exemplary processing performed by such processor to implement the functions of the feature calculator 13, begins in step S1 of FIG. 3. In step S2, the processor receives the aircraft state signal θ and the pilot control signal $F_x$ and stores samples of these values in the processor's memory for respective time increments. In step S3, the processor differentiates the aircraft state signal θ and the pilot control signal $F_x$ by subtracting successive values of the samples for these signals. In step S4, the processor performs filtering of the differentiated signals Δθ and $\Delta F_x$. Preferably, the processor performs step S4 using digital finite impulse response (FIR) band-pass filtering of the signals Δθ and $\Delta F_x$ between 0.2 and 3.0 Hertz to eliminate frequency components other than those at which PIOs are likely to occur. In step S5 of FIG. 3, the processor reads and sums absolute values of the signal Δθ from the memory over a predetermined time interval, preferably including the most recently acquired values of the signal Δθ. The resulting sum can be used for the first feature signal. In step S6 of FIG. 3, the processor determines the frequency of the signal Δθ for use as a second feature signal. The processor can generate the second feature signal from the values of the signal Δθ stored in the memory in a number of ways. For example, the processor can read values from the memory and compare these values with a predetermined level to determine the number of occurrences in which the values pass through the predetermined level over a predetermined time interval. By dividing the number of crossings of the predetermined level by twice the predetermined time interval, the processor can determine the frequency of the signal Δθ for use as the second feature signal. Of course, the discriminator can be configured so that in step S6 it is only necessary to output the number of crossings of the predetermined level, in which case the discriminator is trained or programmed to account for the fact that the number of occurrences of crossing the predetermined level has not been divided by twice the predetermined time interval over which the number of crossings was obtained. As a more specific example, the processor can determine a number of sign changes occurring in the values of the signal Δθ over a predetermined time interval, and divide the number of sign changes by twice the predetermined time interval to generate the frequency of the signal Δθ for use as the second feature signal. Alternatively, the discriminator can be trained or programmed to scale the number of sign changes by dividing by twice the predetermined time interval, in which case the processor can output the number of sign changes as the second feature signal in step S6.

In step S7 of FIG. 3, the processor reads successive values of the signals Δθ and $\Delta F_x$ from the memory, and determines signums of the values of the signals Δθ and $\Delta F_x$. The processor multiplies the signums of the signals Δθ and $\Delta F_x$ together for corresponding times. The products of the signums of the signals Δθ are summed over a predetermined time interval to generate a third feature signal that is output to the discriminator as the third feature signal.

In step S8 of FIG. 3, the processor estimates the frequency of the signal $\Delta F_x$ to be output to the discriminator 14 as the fourth feature signal. The processor estimates the frequency of the signal $\Delta F_x$ in a manner similar to that used to estimate the frequency of the signal $\Delta \theta$ in step S6. More specifically, in step S8 of FIG. 3, the processor can generate the fourth feature signal from the values of the signal $\Delta F_x$ stored in the memory in a number of ways. For example, the processor can read values from the memory and compare these values with a predetermined level to determine the number of occurrences in which the values pass through the predetermined level over a predetermined time interval. By dividing the number of crossings of the predetermined level by twice the predetermined time interval, the frequency of the signal $\Delta F_x$ can be determined and output as the fourth feature signal. It should be appreciated that the discriminator can be configured so that in step S8 it is only necessary to output the number of crossings of the predetermined level. In this case, the discriminator is trained or programmed to account for the fact that the number of occurrences of crossing the predetermined level has not been divided by twice the predetermined time interval over which the number of crossings was obtained. As another example, the processor can determine the number of sign changes occurring in the signal $\Delta F_x$ over a predetermined time interval, and divide the number of sign changes divided by twice the predetermined time interval to generate the fourth feature signal. Alternatively, the discriminator can be trained or programmed to scale the number of sign changes by dividing by twice the predetermined time interval, in which case the processor outputs the number of sign changes as the fourth feature signal.

In step S9 of FIG. 3, the processor reads and sums absolute values of the signal $\Delta F_x$ from the memory over a predetermined time interval, preferably including the most recently acquired values of the signal $\Delta F_x$. The resulting sum can be used for the fifth feature signal. In step S10, the first through fifth feature signals are output to the discriminator 14 that generates the PIO indicator signal, based on the feature signals. In step S11, the processing performed by the feature calculator 13 of FIG. 3 ends.

Figure 4B:
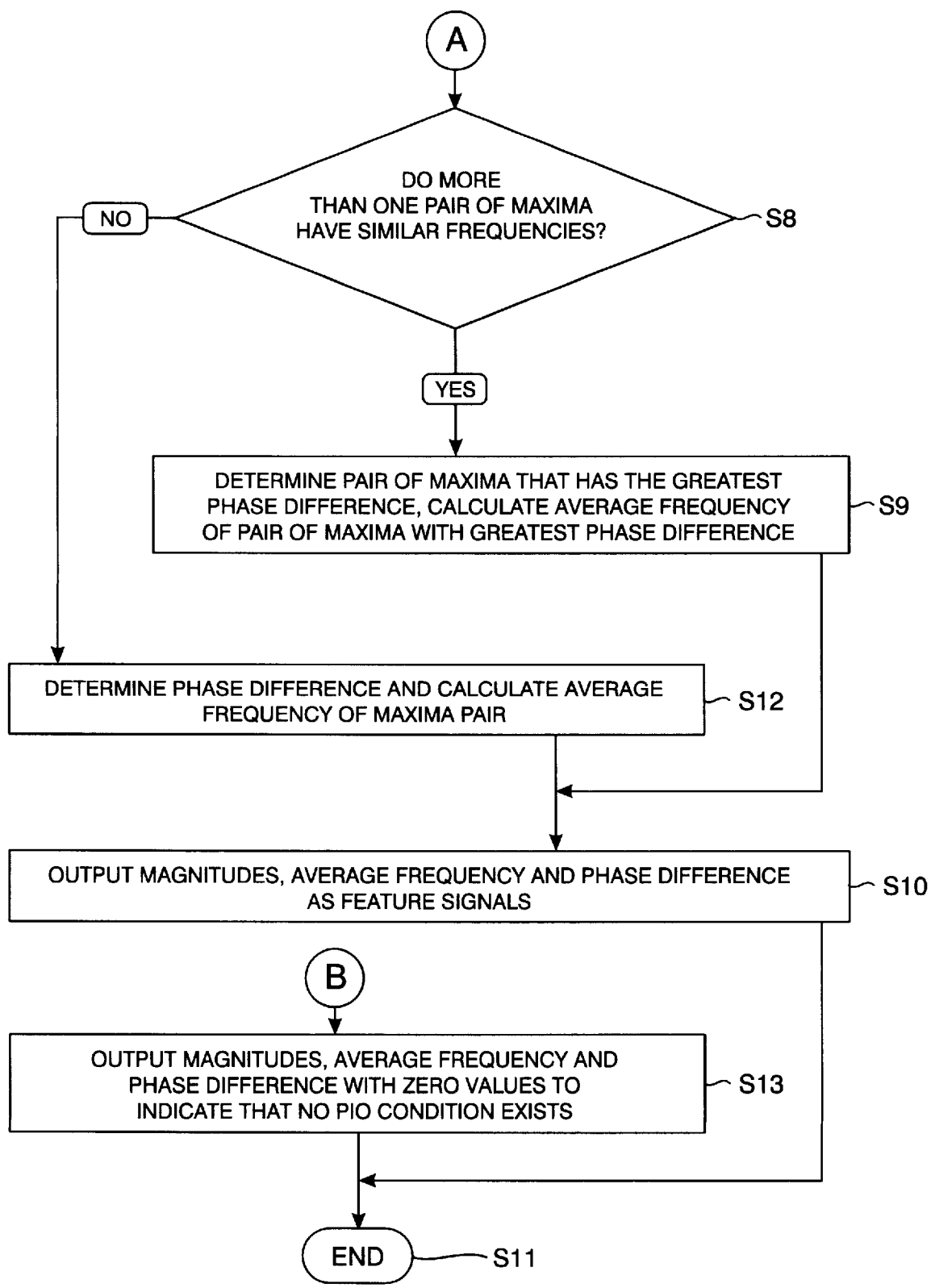

FIGS. 4A and 4B are flow charts of processing performed by a second embodiment of the feature calculator 13. The second embodiment of the feature calculator includes a processor (not shown) and a memory (not shown). The processor is coupled to receive the aircraft state signal $\theta$ and the pilot control signal $F_x$, and is coupled to output feature signals to the discriminator. The processor is also coupled to the memory that is used to store the processor's control program and samples of the aircraft state signal $\theta$ and the pilot control signal $F_x$ taken at successive time increments $\Delta t$, as well as temporary data for the generation of the feature signals, and preferably also the feature signals themselves. In step S1, the processing of FIG. 4A begins. In step S2, the processor samples the aircraft state signal $\theta$ and the pilot control signal $F_x$ at successive time increments $\Delta t$ and stores the samples in the memory. When a predetermined number, or time window, of samples have been obtained for each of the aircraft state signal $\theta$ and the pilot control signal $F_x$, the processor multiplies samples of the aircraft state signal $\theta$ and the pilot control signal $F_x$ by respective Kaiser windows to condition the samples in step S3. In step S4, the processor performs a fast Fourier transform (FFT) on the windows of samples of the aircraft state signal $\theta$ and the pilot control signal $F_x$ to generate frequency-domain representations of the aircraft state signal $\theta$ and the pilot control signal $F_x$. In step S5, the complex values of the frequency components of the frequency-domain representations of the aircraft state signal $\theta$ and the pilot control signal $F_x$ that are stored in the memory, are used by the processor to calculate magnitudes and phases for the complex values. The magnitudes and phases are stored in the memory in association with respective frequencies. In step S6, the processor determines the n largest maxima of the magnitudes for each of the aircraft state signal $\theta$ and the pilot control signal $F_x$, where n is a predetermined value (preferably equal to 4). In step S7, the processor determines whether any of the maxima of the aircraft state signal $\theta$ and the pilot control signal $F_x$ occur at similar frequencies. Preferably, the maxima of the magnitudes of the aircraft state signal $\theta$ and the pilot control signal $F_x$ are considered to be at similar frequencies if the processor determines that they are within $\pm 0.3$ Hertz of each other. If the processor determines that at least one pair of maxima of the magnitudes of the aircraft state signal $\theta$ and the pilot control signal $F_x$ occur at similar frequencies, control proceeds to step S8 of FIG. 4B in which a determination is made to establish whether more than one pair of maxima have similar frequencies. If so, control proceeds to step S9 in which the processor determines which of the maxima pairs has the largest phase difference. Also, in step S9, for the maxima pair that has the greatest phase difference, the processor calculates the average frequency of the two maxima by adding the frequencies for the maxima of the magnitudes of the aircraft state signal $\theta$ and the pilot control signal $F_x$, and dividing the resulting sum by two. Control proceeds to step S10 in which the processor outputs the magnitudes of the maxima pair with the largest phase difference, as well as the average frequency and the phase difference. These values are output to the discriminator for generation of the PIO indicator signal. After performing step S10, processing for the current time increment $\Delta t$ ends in step S11.

On the other hand, in step S8, if the processor determines that only one pair of maxima have similar frequencies, control proceeds to step S12. In step S12, the processor determines the phase difference and calculates the average frequency of the maxima pair. Control proceeds to step S10 in which the magnitudes of the maxima pair, the average of the frequencies of the two maxima, and the phase difference between the two maxima, are output as feature signals to the discriminator 14, and processing for the current time increment $\Delta t$ ends in step S11.

In step S7 of FIG. 4A, if the processor determines that none of the maxima occur at similar frequencies, control proceeds to step S13 of FIG. 4B in which zero values are output to the discriminator for the magnitudes, average frequency and phase difference to indicate that no maxima have similar frequencies and accordingly that no PIO condition exists. Control proceeds to step S11 in which processing for the current time increment $\Delta t$ terminates. Preferably, the processing of FIGS. 4A and 4B is repeated every time increment $\Delta t$ during aircraft flight to detect the existence of a PIO condition should any occur.

With the second embodiment of the feature calculator implemented with the processing of the flow charts of FIGS. 4A and 4B, the calculated feature signals include the two magnitudes of the complex values of the frequency components of the frequency-domain representations of the aircraft state signal $\theta$ and the pilot control signal $F_x$ (for the maxima pair with the largest phase difference if more than one maxima pair with similar frequencies exist). The calculated feature signals also include the average frequency determined by dividing the sum of the frequencies of the maxima of the frequency-domain representation of the aircraft state signal $\theta$ and the maxima of the frequency-domain representation of the pilot control signal $F_x$, by two. In addition, the calculated feature signal includes the phase difference between the phases of the maxima of the frequency components of the frequency-domain representations of the aircraft state signal $\theta$ and the pilot control signal $F_x$. In a manner similar to the embodiment of FIG. 2, the discriminator 14 preferably includes a neural network that is trained to generate the $PIO_\theta$ indicator signal based upon features calculated from data from actual or simulated PIOs and a person's judgment as to whether a PIO condition exists based on the data.

Figure 5A:
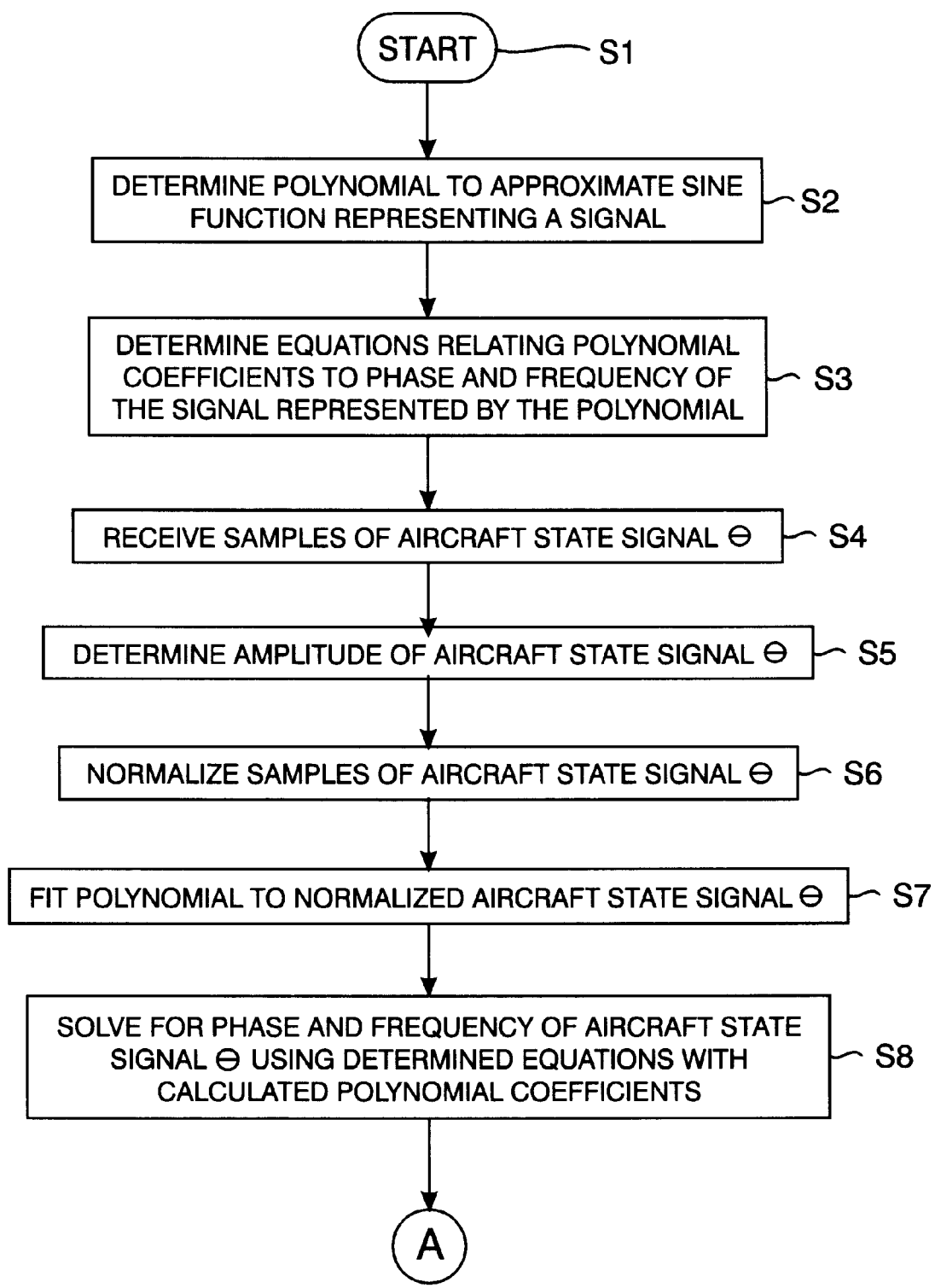
FIGS. 5A and 5B are flow charts of processing performed by a processor to implement a third embodiment of the feature calculator included in the PIO detector.
Figure 5B:
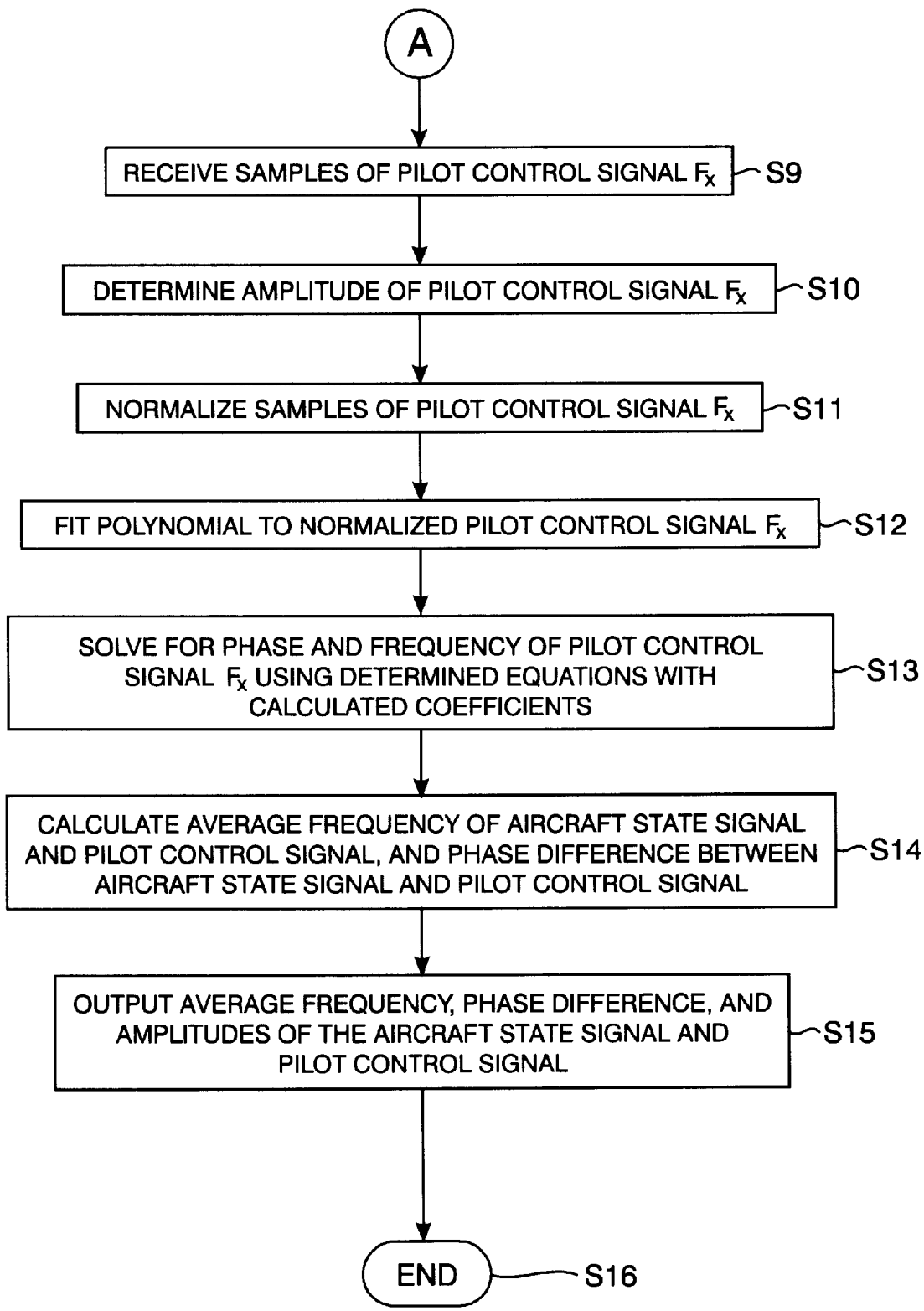

In a third embodiment of the feature calculator, the feature calculator includes a processor (not shown) and a memory (not shown). The processor is coupled to receive the aircraft state signal $\theta$ and the pilot control signal $F_x$, and is also coupled to output feature signals to the discriminator. The processor is also coupled to the memory that is used to store the processor's control program, samples of the aircraft state signal $\theta$ and the pilot control signal $F_x$ taken at successive time increments $\Delta t$, and data calculated when performing the processing dictated by the processor's control program, and preferably also the feature signals ultimately generated by the processor. The third embodiment of the feature calculator can be used to estimate spectral features by fitting a sine function or a sum of sine functions similar to a Fourier series, to either or both of the pilot control signal or the aircraft state signal. Processing primarily performed by a preferred version of the third embodiment of the feature calculator is shown in FIGS. 5A and 5B. In step S1 of FIG. 5A, the processing performed by the processor under control of a control program stored in its memory, begins in step S1. In step S2, a polynomial to be used to approximate a sine function representing a signal, is determined. Preferably, the polynomial is determined in advance and programmed into the processor's memory. In the preferred embodiment, the polynomial is a seventh-order polynomial with the form:

$$c_0+c_1x+c_2x^2+c_3x^3+c_4x^4+c_5x^5+c_6x^6+c_7x^7. \quad (1)$$

Alternatively, a sum of polynomials representing a sum of sine functions can be used to approximate the signal, although the manner of implementing this variant will readily understood based on the following description that pertains only to a single polynomial. In step S3, equations are determined to relate polynomial coefficients to phase and frequency of the signal that is represented by the polynomial. Preferably, the equations are determined by a Fourier series expansion of the function $\sin(Ft+P)$ where F is the frequency of the signal, t is the time, and P is the phase of the signal. The Fourier series expansion of $\sin(Fx+P)$ is:

$$\sin(Fx+P) - P - P^3/6 + P^5/120 + P^7/5040 + [F-FP^2/2+FP^4/24-FP^6/720]x+\ldots \quad (2)$$

Accordingly, the equations used to relate polynomial coefficients to the Fourier phase and frequency are:

$$c_0 = P - P^3/6 + P^5/120 - P^7/5040; \quad (3)$$

and $$c_1 = F - FP^2/2 + FP^4/24 - FP^6/720. \quad (4)$$

In step S4 of FIG. 5A, the feature calculator samples the aircraft state signal $\theta$ at time intervals $\Delta t$ and stores these samples in its memory. In step S5, the feature calculator determines the amplitude of the aircraft state signal $\theta$ over a predetermined number of samples, for example, by determining the maxima and/or minima of the samples, averaging the maxima and minima, subtracting the average maxima and minima values, and dividing the difference by two. In step S6, the feature calculator normalizes the samples by dividing each sample by the amplitude determined in step S5. In step S7, the feature calculator fits the polynomial indicated in (1) above, to the normalized samples of the aircraft state signal $\theta$. For example, the feature calculator can use the well-known least squares technique to fit the polynomial to the samples of the aircraft state signal $\theta$. In step S8, using equations (3) and (4) with substitution of the values for $c_0$ and $c_1$ determined by the least squares technique, the feature calculator determines the frequency F and the phase P of the aircraft state signal $\theta$. In step S9 of FIG. 5B, the feature calculator receives samples of the pilot control signal $F_x$ at time intervals $\Delta t$, and stores these values in its memory. In step S10, the feature calculator determines the amplitude of the pilot control signal, for example, by determining maxima and minima of the samples over a predetermined number of samples, averaging the maxima and minima, subtracting the averaged minima from the averaged maxima, and dividing the result by two. In step S11, the feature calculator normalizes the samples by dividing the samples by the amplitude of the pilot control signal $F_x$. In step S12, the feature calculator fits the polynomial of equation (1) using the least squares technique, for example, to the normalized samples of the pilot control signal $F_x$ to determine the coefficients $c_0$ and $c_1$ for the polynomial representing the pilot control signal $F_x$. In step S13, the coefficients $c_0$ and $c_1$ are substituted into relations (3) and (4), and the feature calculator solves these equations for the frequency F and the phase P of the pilot control signal $F_x$. In step S14, the feature calculator determines the average frequency of the aircraft state signal $\theta$ and the pilot control signal $F_x$ by adding the frequencies determined in steps S8 and S13, and dividing the resulting sum by two. The feature calculator also determines the phase difference between the aircraft state signal $\theta$ and the pilot control signal $F_x$ by subtracting the two phases determined in steps S8 and S13. In step S15, the feature calculator outputs the average frequency of the aircraft state signal $\theta$ and the pilot control signal $F_x$, the phase difference between the aircraft state signal $\theta$ and the pilot control signal $F_x$, and the amplitudes of the aircraft state signal $\theta$ and the pilot control signal $F_x$, as feature signals to the discriminator. The processing performed by the third embodiment of the feature calculator terminates in step S16 of FIG. 5B.

Figure 6A:
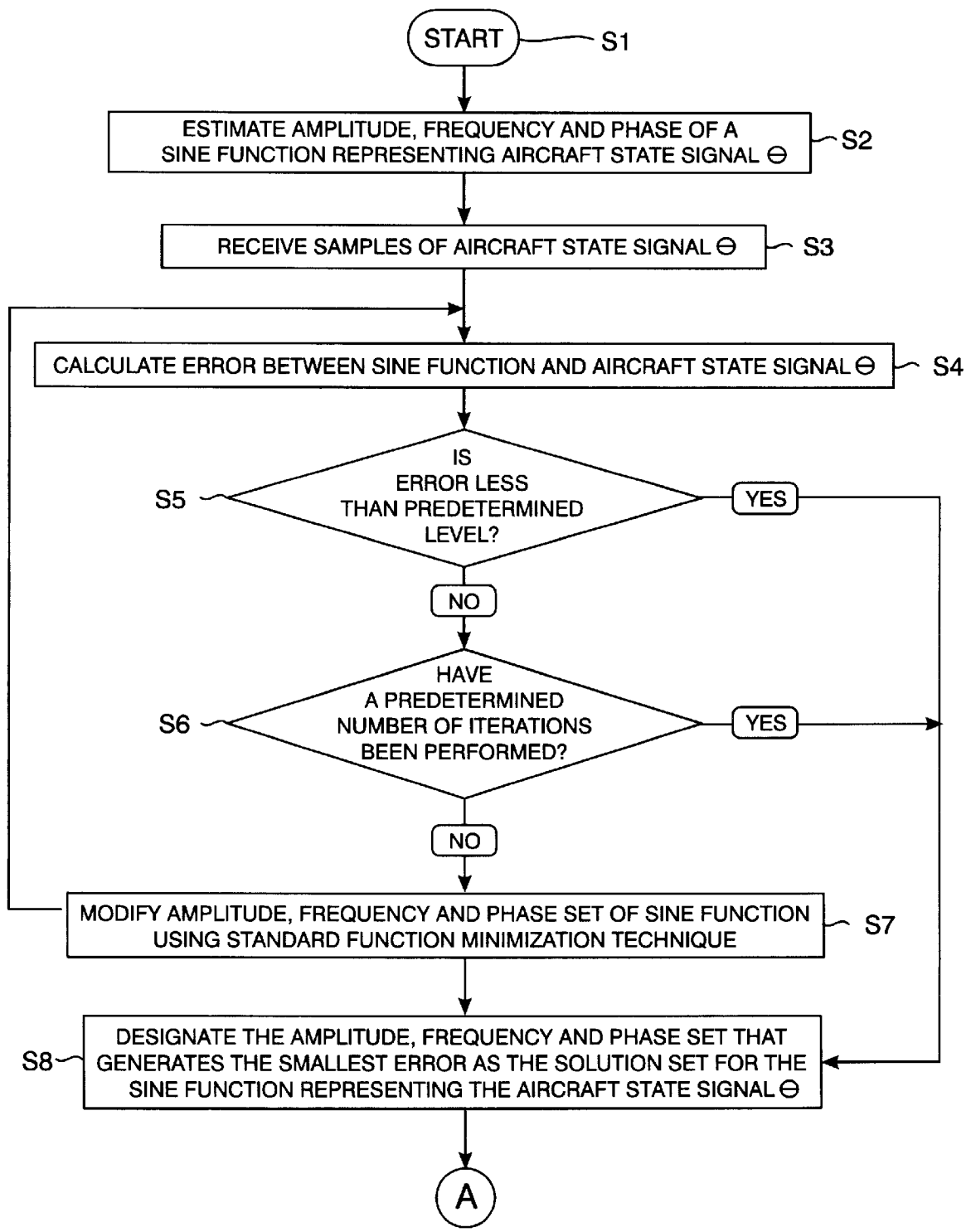
FIGS. 6A and 6B are flow charts of processing performed by a processor to implement a fourth embodiment of the feature calculator of the PIO detector.
Figure 6B:
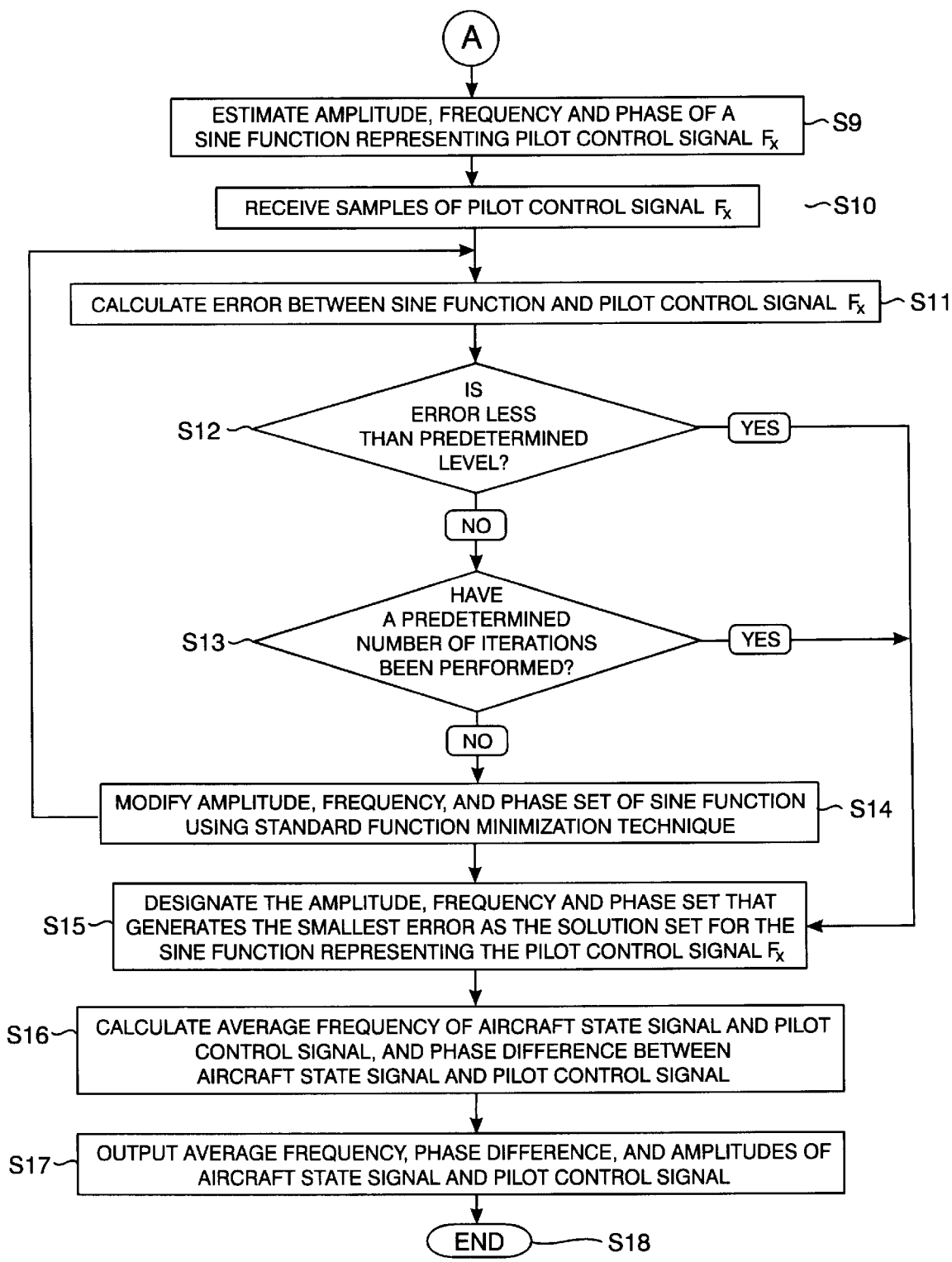

FIGS. 6A and 6B are flow charts of processing performed primarily by a fourth embodiment of the feature calculator that preferably includes a processor coupled to receive the aircraft state signal $\theta$ and the pilot control signal $F_x$, and a memory that is coupled to the processor, and that stores the control program used to implement the processing of FIGS. 6A and 6B. The memory also serves to store samples of the aircraft state signal $\theta$ and the pilot control signal $F_x$ that are obtained by the processor, initial estimates of the amplitude, frequency and phase defining sine functions approximating the aircraft state signal and the pilot control signal, as well as temporary data used to determine the feature signals ultimately output by the feature calculator, and preferably also the feature signals themselves. The processing of FIGS. 6A and 6B uses a function minimization technique to determine the amplitudes, frequencies and phases of the aircraft state signal $\theta$ and the pilot control signal $F_x$.

In step S1 of FIG. 6A, the processing primarily performed by the fourth embodiment of the feature calculator begins. In step S2, the amplitude, frequency and phase of a sine function representing the aircraft state signal $\theta$, are estimated. For the first iteration of the function minimization technique, the feature calculator is preferably preprogrammed with a set of amplitude, frequency and phase estimates that have values at which a PIO could conceivably occur. The estimated amplitude, frequency and phase are not required to be particularly accurate estimates, but need only be such that the technique converges to a solution set using the estimates. However, the closer the estimates of the amplitude, frequency and phase are to the amplitude, frequency and phase of an actual PIO, in general, the faster the technique will converge to the solution set. For example, the estimated frequency should be in a range from 0.5 to 3 Hertz at which PIOs can occur in most aircraft. The set of amplitude, frequency and phase estimates are preferably preprogrammed into the feature calculator's memory.

In step S3, the feature calculator's processor receives and stores samples of the aircraft state signal θ that are sampled at increments Δt, preferably taken at 0.1 second increments, over a time window of predetermined duration, preferably 2.0 seconds. In step S4, the feature calculator determines and stores the error between the sine function defined by the set of estimates for the amplitude, frequency, and phase, and the samples of the aircraft state signal θ, over the time window for one iteration of the technique. Preferably, the error is calculated according to the equation:

$$E = \Sigma_i (\theta(t-i) - A_j \sin(F_j \cdot t + P_j))^2 \quad (5)$$

where E is the error function, θ(t−i) is the sample value of the aircraft state signal at time (t−i), i=0, ..., n of samples occurring in a time window or interval n·Δt, and $A_j$, $F_j$, $P_j$ are estimates of the amplitude, frequency and phase, respectively, at iteration j. At the conclusion of one iteration, in step S5, the feature calculator's processor determines whether the error is less than a predetermined level stored in its memory, that corresponds to the tolerable error. If the error is not less than the predetermined acceptable error level, processing proceeds to step S6 in which the feature calculator determines whether a predetermined number of iterations have been performed. If the feature calculator has not performed the predetermined number of iterations, in step S7, the feature calculator modifies the amplitude, frequency and phase set for the next iteration using a standard function minimization technique that is preferably a simplex method. The feature calculator can be programmed with commercially-available software such as Matlab™ from The Math Works™, Inc. of Natick, Mass., to perform the simplex method to minimize the error function that is preferably the function given in relation (5). On the other hand, if the feature calculator determines in step S5 that the error for the iteration is less than the predetermined level, or if a predetermined number of iterations have been performed, processing performed by the feature calculator proceeds to step S8. In step S8, the feature calculator designates the amplitude, frequency and phase set that generates the smallest error (usually the last set of amplitude, frequency and phase estimates determined by the feature calculator), as the solution set for the sine function representing the aircraft state signal.

From step S8 of FIG. 6A, processing performed by the feature calculator proceeds to step S9 of FIG. 6B. In steps S9–S15, the feature calculator generally performs similar processing to that of steps S2–S8 pertaining to the aircraft state signal, to determine a solution set of amplitude, frequency and phase of a sine function representing the pilot control signal. More specifically, in step S9, the amplitude, frequency and phase of the sine function used to represent the pilot control signal, are estimated. Preferably, these estimates are preprogrammed into the feature calculator for use as initial values in the performance of the function minimization technique for the pilot control signal $F_x$. In step S10, the feature calculator receives and stores samples of the pilot control signal $F_x$ taken at time increments Δt over the time window. In step S11, the feature calculator determines the error between the sine function defined by the amplitude, frequency and phase estimates, and the samples of the pilot control signal $F_x$. In step S12, the feature calculator determines whether the error calculated in step S11, is less than a predetermined level. If the error is not less than the predetermined level, processing proceeds to step S13 in which the feature calculator determines whether a predetermined number of iterations have been performed. If the predetermined number of iterations have not been performed, processing proceeds to step S14 in which the feature calculator modifies the amplitude, frequency and phase set using a standard function minimization technique. Preferably, the minimization technique is the simplex method performed with a software package such as Matlab™, that minimizes an error function of the sine function defined by the estimates of the amplitude, frequency and phase of the pilot control signal, and the samples of the pilot control signal. Preferably, the error function is a squared error function given by the relation:

$$E = \Sigma(F_x(t-i) - A_j \sin(F_j \cdot t + P_j))^2 \quad (6)$$

where E is the error function, $F_x$(t−i) is the sample value of the pilot control signal at time (t−i), i=0, ..., n of samples occurring in a time window or interval n·Δt, and $A_j$, $F_j$, $P_j$ are estimates of the amplitude, frequency and phase, respectively, at iteration j. After modification of the estimates of the frequency, amplitude and phase for the sine function used to represent the pilot control signal $F_x$, processing returns to step S11. On the other hand, if in step S12 the feature calculator determines that the error is less than a predetermined level, or if the feature calculator determines that a predetermined number of iterations have been performed in step S13, processing proceeds to step S15 in which the feature calculator designates the amplitude, frequency and phase set that generates the smallest error as the solution set for the sine function representing the pilot control signal $F_x$ for the current time window. In step S16, the feature calculator determines the average frequency of the aircraft state signal and the pilot control signal using the frequencies of respective solution sets, and determines a phase difference by subtracting the phases of respective solution sets. In step S17, the feature calculator outputs the average frequency and phase difference determined in step S16, and the amplitudes of the aircraft state signal and the pilot control signal, as feature signals supplied to the discriminator. Processing performed by the fourth embodiment of the feature calculator terminates in step S18.

The processing of FIGS. 6A and 6B performed by the fourth embodiment of the feature calculator to calculate feature signals provides the advantage that it is relatively insensitive to noise. However, to perform the large number of calculations that are needed to generate feature signals that are reasonably indicative of a PIO condition within a reasonably short amount of time (2 or 3 seconds, for example), the feature calculator requires a relatively advanced, high-speed processor.

In the first through fourth embodiments of the feature calculator, it is preferred to perform the respective processing of FIGS. 3 through 6B once for each successive time increment Δt for the most recent samples of the aircraft state signal and the pilot control signal occurring in the predetermined time window or interval. Thus, with each time increment Δt, the time window shifts forward in time by Δt to include the latest samples of the aircraft state signal and the pilot control signal.

The detector 8 is highly effective to detect the existence of a PIO condition in an aircraft. Once detected, as previously mentioned, the PIO indicator signal can be supplied to an alarm such as a buzzer or blinking light indicator, to alert the pilot of the existence of the PIO condition so that the pilot can take corrective action. In addition, the detector 8, or more specifically, the discriminator 14, is coupled to output the PIO indicator signal to the PIO compensator 9 that generates the compensation signal used by the pilot input modifier 11 to modify the pilot control signal in a manner that eliminates the PIO condition driven by the pilot. FIG. 7 is a block diagram of a preferred embodiment of the PIO compensator 9 and the pilot input modifier 11 to correct for PIOs in the pitch angle θ attitude. As will be readily understood by those of average skill in this technological field, the PIO compensator 9 can be readily adapted to receive a $PIO_\phi$ indicator signal and $PIO_\psi$ indicator signal, and the pilot input modifier 11 can be readily adapted to receive pilot control signal $F_y$ or $\delta_y$, or $\delta_r$, to compensate for PIOs along the aircraft's roll φ or yaw ψ attitudes, respectively.

In FIG. 7, a limiter 25 is coupled to receive the $PIO_\theta$ indicator signal from the discriminator 14. For values of the $PIO_\theta$ indicator signal below a first predetermined level or above a second predetermined level, the limiter 25 functions to output first or second predetermined values, respectively. The first predetermined value indicates that no PIO condition exists in the pitch angle attitude θ, and the second predetermined value indicates with certainty that a PIO condition exists in the pitch angle attitude θ. Between the first and second predetermined values, the limiter 25 outputs a value that increases linearly, preferably with a slope of +1, with increasing values of the $PIO_\theta$ indicator signal, to represent increasing likelihood that a PIO exists in the pitch attitude of the aircraft. The output of the limiter 25 is coupled to an input terminal of a switch 26. The switch 26 has a control input that is coupled to receive the $PIO_\theta$ indicator signal from the discriminator 14. The state of the $PIO_\theta$ indicator signal controls the state of the switch 26, as will be described later in further detail.

The output terminal of the switch 26 is coupled to the input of an integrator 27 that integrates the $PIO_\theta$ indicator signal over a predetermined time interval, for example, of 2.0 seconds. The output of the integrator 27 is coupled to a limiter 28 for scaling in a manner similar to that performed by the limiter 25. More specifically, if the output of the integrator is below a first predetermined value or above a second predetermined value, the limiter 28 outputs first and second predetermined values, respectively. For values of the integrator's output between the first and second predetermined values, the limiter 28 outputs a value that increases linearly with a slope of +1 between the first and second predetermined values, as the value of the integrator's output increases. The limiter 28 serves to scale the integrator's output to a degree appropriate for feedback through a scaler 29. More specifically, the scaler 29 is coupled to receive the output of the limiter 28 and serves to decay the integrator's output for a time sufficiently long so that the apparatus' correction of the PIO condition is not disconcerting to the pilot, and yet is sufficiently short so that if a PIO condition subsequently arises, it is eliminated before any damage or injury is caused by the PIO condition. The inventors have determined that a scale factor of –1⅔ for the scaler 29 provides excellent results. The output of the scaler 29 is coupled to a second input of the switch 26. When the value of the $PIO_\theta$ indicator signal received at the control input of the switch 26 is greater than or equal to a predetermined threshold level indicating that a PIO condition exists, the switch 26 is in a state that couples the output of the limiter 25 to the input of the integrator 27 and decouples the output of the scaler 29 from the input of the integrator 27. On the other hand, if the $PIO_\theta$ indicator signal received at the control input to the switch 26 is below the threshold level, the switch 26 is in a state in which the output of the limiter 25 is decoupled from the input to the integrator 27 and the output of the scaler 29 is coupled to the input of the integrator 27 to decay the integrator's output.

The output of the limiter 28 is coupled to the input of a limiter 30. The limiter 30 performs scaling that is inversely proportional to the level of the output from the limiter 28. More specifically, if the scaled output is at its relatively low first predetermined value, the limiter 30 outputs a compensation signal with a corresponding relatively high value because no modification of the pilot control signal is necessary if no PIO condition exists. Conversely, if the compensation signal generated by the limiter 30 is at its relatively high, second predetermined value, the pilot control signal needs severe modification to eliminate the PIO condition. Thus, the limiter 30 outputs a compensation signal with a relatively low value. If the output of the limiter 28 assumes some intermediate value, the limiter 30 will generate a compensation signal assuming a value intermediate between its relatively high and low extreme values, but varying in an inverse sense, preferably with a slope of –1, relative to the value of the output from the limiter 28. The high and low extremes of the limiter 30 are preferred to be 1.0 and 0.1, respectively, but of course may differ from these values. The high value of 1.0 gives the pilot total control of the aircraft in the absence of a PIO condition. On the other hand, in an extreme PIO condition, the 0.1 value limits the pilot's input severely, yet not so much as to totally eliminate the pilot's control of the aircraft.

The output of the limiter 30 is coupled to supply the compensation signal to the pilot input modifier 11. The pilot input modifier 11 can be implemented as a multiplier 31 that multiplies the pilot control signal and the compensation signal together to generate a modified pilot control signal. The multiplier 31 is coupled to output the modified pilot control signal to the aircraft actuator(s) 7, via the flight control system to eliminate the PIO condition.

The gain modification or reduction can be implemented broadly over a wide range of frequencies of the pilot control signal, or can be implemented in a relatively narrow window of frequencies about the PIO frequency by use of a notch filter (not shown) that replaces the multiplier 31 and that is coupled to receive and filter the pilot control signal, based on the compensation signal. The notch filter's attenuation can be based on the compensation signal, or alternatively, can be activated to filter the pilot control signal based on the level of the compensation signal.

Alternatively, the pilot input modifier 11 can be implemented with a variable delay used in place of the multiplier 31. In this case, the pilot control signal is delayed by an amount directly proportional to the value of the compensation signal before it is output as modified pilot control signal to the aircraft actuator(s) 7. The shift in phase to affect modification of the pilot control signal to eliminate the PIO condition can be performed at one or more frequency components of the pilot control signal. Thus, either the gain or phase of the pilot control signal can be modified to affect the elimination of a PIO condition in the invented apparatus.

Figure 8:
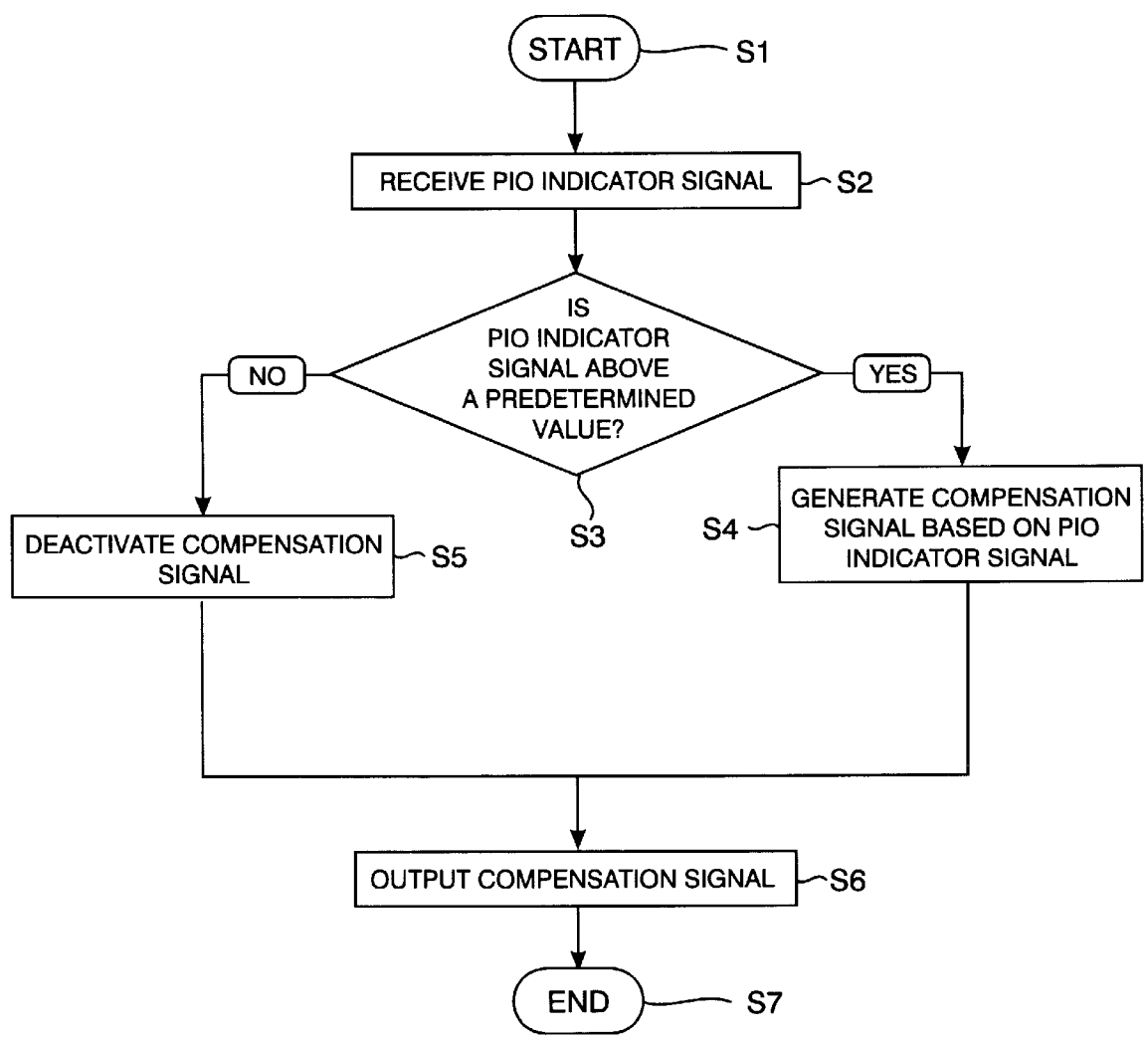
FIG. 8 is a flow chart of processing performed by a processor in a second implementation of the PIO compensator.

Although the embodiment of the PIO compensator of FIG. 7 is shown and described as an assembly of discrete elements, it is of course possible to implement the functions performed by these elements in a processor with appropriate programming. FIG. 8 is a flowchart of processing performed by such processor to implement the PIO compensator 9. To perform the processing of FIG. 8, the processor is coupled to receive the PIO indicator signal from the PIO detector. Preferably, the processor is coupled to a memory that stores its control program, samples of the PIO indicator signal, temporary data generated in the performance of the processing, and preferably also the compensation signal, that is generated and output by the PIO compensator.

The processing performed by the processor implementing the PIO compensator, begins in step S1 of FIG. 8. In step S2, the processor receives the PIO indicator signal from the PIO detector 8. In step S3, the processor determines whether the level of the PIO indicator signal is above a predetermined level, a function that is similar to that performed by the switch 26 in FIG. 7. If so, in step S4, the processor generates the compensation signal, preferably by integrating and scaling the PIO indicator signal in a manner that parallels the functions performed by the limiter 25, the integrator 27, and the limiters 28, 30 in FIG. 7. On the other hand, if in step S3 the processor determines that the PIO indicator signal is less than or equal to the predetermined level, the processor deactivates the compensation signal in step S5, preferably by decaying the compensation signal if it was activated prior to the determination performed in step S2, in a manner that parallels the functions performed by the integrator 27, the limiter 28, and the scaler 29 of FIG. 7. After either performing either step S4 or S5, the processor outputs the compensation signal in step S6 to the flight control system, or more specifically, to the pilot input modifier 11. After the performance of step S6, the processing performed by the processor terminates in step S5 of FIG. 8. Preferably, the processor repeats the processing of FIG. 8 each time a new sample of the PIO indicator signal is available from the PIO detector.

Figure 9:
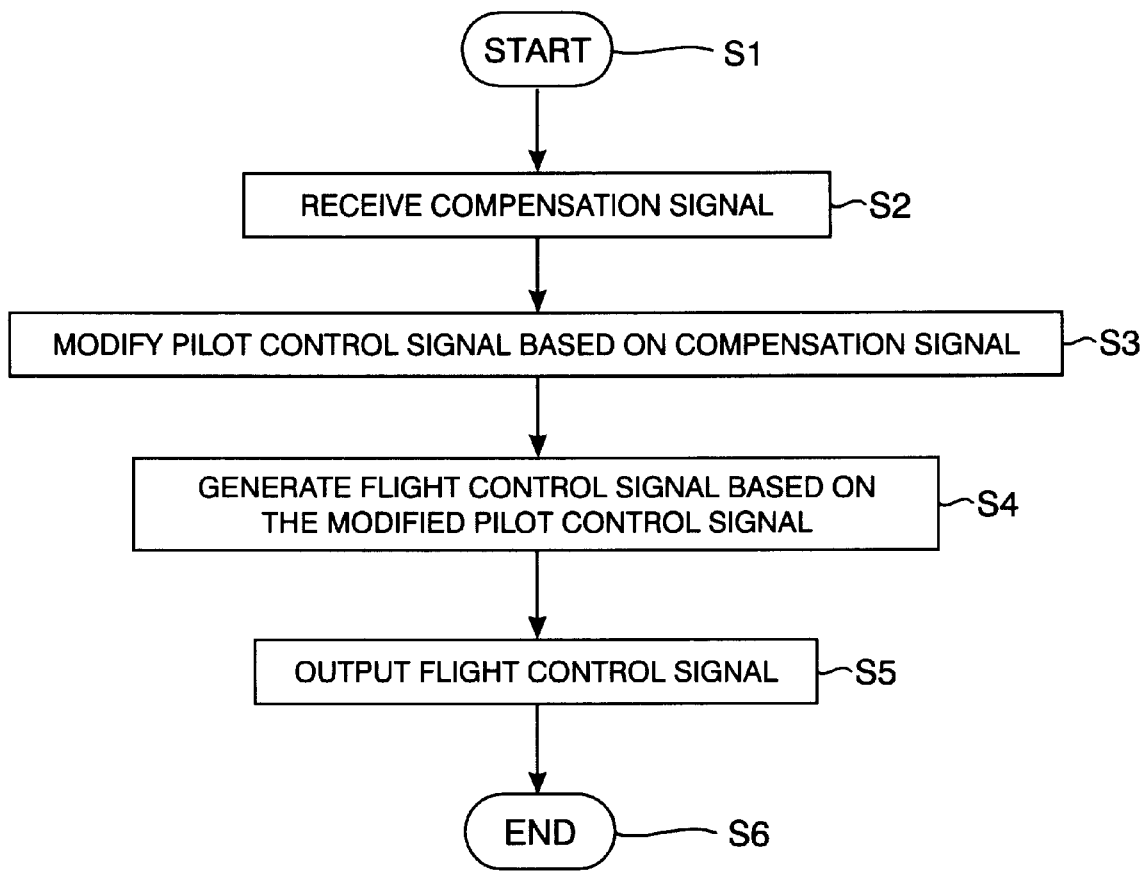
FIG. 9 is a flow chart of processing performed by a processor of a flight control system.

The pilot input modifier 11 of FIG. 7 is shown as a discrete element of the flight control system. The pilot input modifier can be implemented in a processor of the flight control system with appropriate programming. FIG. 9 is a flow chart of processing used to implement the pilot input modifier, and a portion of the flight control system 6 that is relevant to the invention. The flight control system's processor is coupled to receive the compensation signal from the PIO compensator 9, and is coupled to a memory that stores its control program used to implement the processing of FIG. 9, the compensation signal, data generated during performance of the control program, the modified pilot control signal, and preferably also the flight control signal.

The processing performed by the flight control system to implement the pilot input modifier and a portion of the flight control system, begins in step S1 of FIG. 9. In step S2, the processor receives the compensation signal. In step S3, the processor modifies the pilot control signal, based on the compensation signal. Step S2 of FIG. 9 thus parallels the function performed by the pilot input modifier in FIG. 7. The processor can be programmed to modify the pilot control signal by reducing the gain or shifting the phase of the pilot control signal relative to the aircraft state signal, to eliminate a PIO condition. Also, the processor can be programmed to modify the pilot control signal over a relatively broad range of frequencies or at a relatively narrow frequency band at which a PIO condition occurs. Further, the processor can be programmed to notch filter the pilot control signal at the frequency band at which a PIO condition exists, based on the compensation signal. In step S4, the flight control system's processor generates a flight control signal, based on the modified pilot control signal. In step S5, the processor outputs the flight control signal to the aircraft actuator(s) 7 to control the aircraft in a manner to eliminate a PIO condition if any exists. In step S6, the processing performed by the flight control system's processor terminates.

Figure 10:
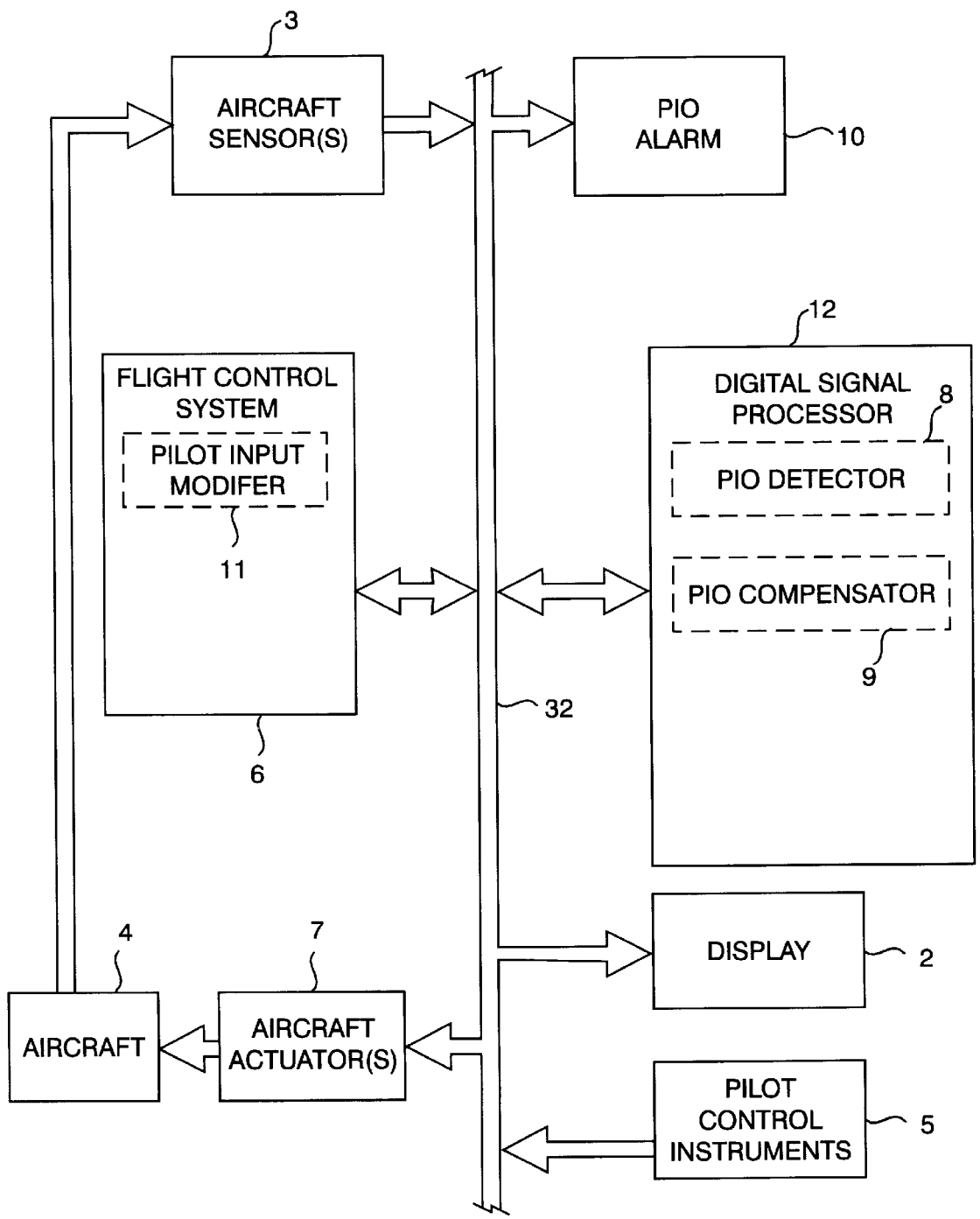
FIG. 10 is a block diagram showing an exemplary implementation of the invented apparatus.

FIG. 10 is a block diagram of a possible implementation of the apparatus of this invention in an aircraft. In FIG. 10, the pilot display 2, the aircraft sensor(s) 3, the control instruments 5, the flight control system 6, the aircraft actuator(s) 7, the PIO alarm 10 and the digital signal processor 12, are coupled to a bus 32. In FIG. 10, the aircraft sensor(s) 3 generate aircraft state signal(s) supplied via bus 32 to the pilot's display 2 to indicate the aircraft's state to the pilot. The aircraft state signal(s) is also supplied from the sensor(s) 3 via the bus 32 to the digital signal processor 12. The processor 12 also receives pilot control signal generated by the pilot's control instruments 5. The processor 12 is programmed to implement the functions of the PIO detector 8, and generates a PIO indicator signal based on the aircraft state signal and the pilot control signal. The PIO indicator signal is output to the PIO compensator 9 (as shown in FIG. 7, for example) also implemented through programming of the processor 12, that generates a compensation signal based on the PIO indicator signal. The compensation signal is output from the processor 12 to the pilot input modifier 11 of the flight control system 6 via the bus 32. The pilot input modifier 11 implemented by programming of a processor included in the flight control system 6, receives the compensation signal and the pilot control signal. The pilot input modifier 11 generates a modified pilot control signal, based on the compensation signal and the pilot control signal. If a PIO condition exists, the pilot input modifier outputs the modified pilot control signal to the aircraft flight control system 6. The flight control system 6 generates a flight control signal(s) to control the actuator(s) 7 to affect actions in the aircraft 4 that control its pitch, roll and/or yaw attitudes, based on the modified pilot control signal, to eliminate the PIO condition before any damage or injury occurs.

Figure 11:
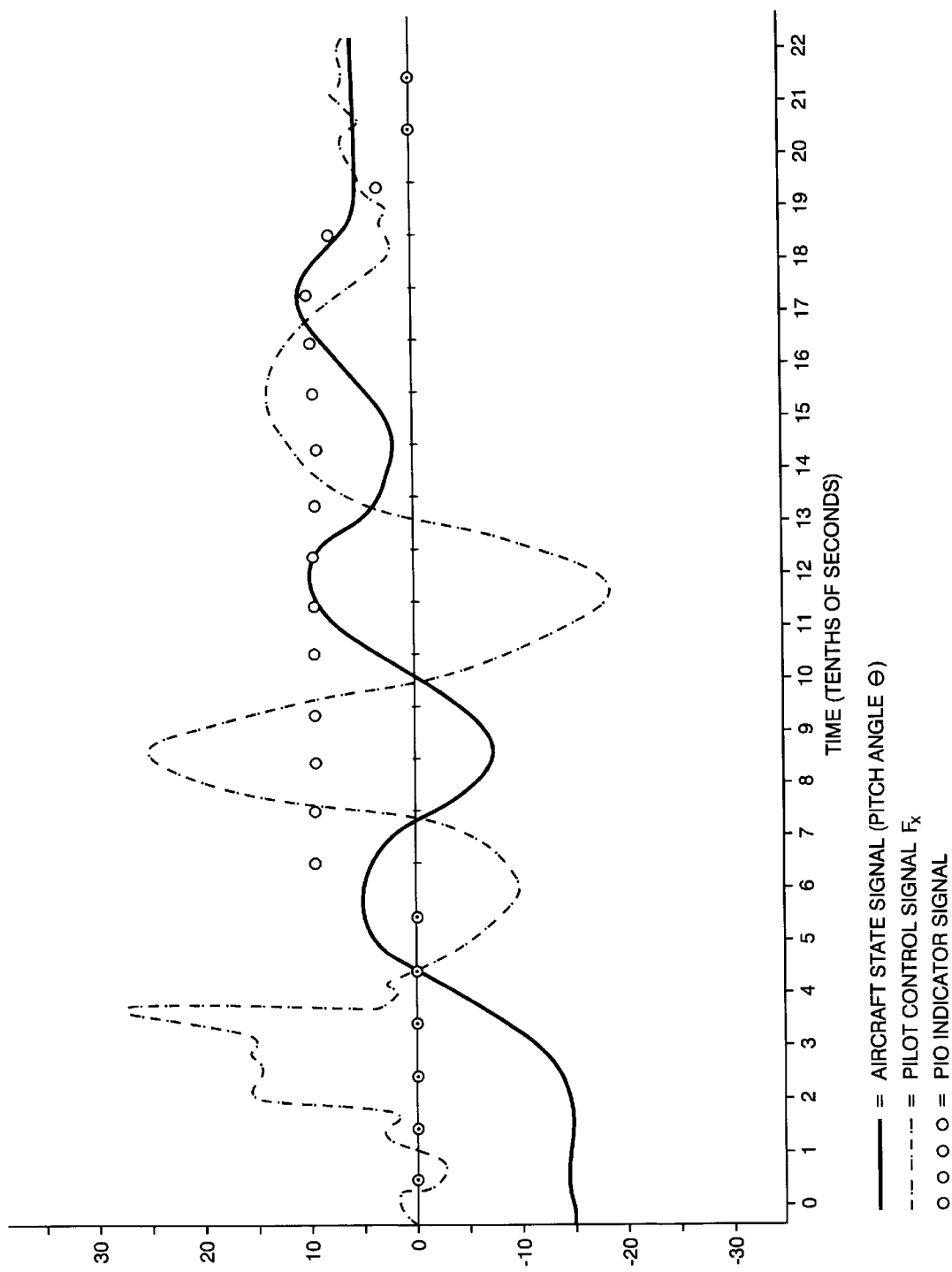
FIG. 11 is a graph of aircraft state signal, pilot control signal and PIO indicator signal versus time before, during and after the occurrence of a PIO condition.

FIG. 11 is a graph of an aircraft state signal, a pilot control signal and a PIO indicator signal versus time, showing an example of the onset of a PIO condition, and its elimination by the invented apparatus. In FIG. 11, as indicated by the solid line representing the aircraft state signal (in this case, the pitch angle θ), the aircraft is initially in a −15 degree dive at the start of a time duration of interest at 0.0 seconds. At the elapse of about 0.3 seconds, the pilot manipulates the control instrument (in this case, by deflection force of the joystick in the x-axis direction to generate a deflection force $F_x$.) in an effort to steer the aircraft into a +5 degree climb. The aircraft responds and gradually levels to a pitch angle of zero degrees at about 0.5 seconds elapsed time. The pilot drives the control instrument in the negative x-axis direction to control the aircraft to hold at a pitch angle of +5 degrees. However, the pilot's deflection force is approximately 180 degrees out-of-phase with the aircraft's control response, thus driving a PIO condition from about 0.7 to 2.0 seconds. The PIO detector 8 detects the existence of the PIO condition, and, as indicated by the plotted circles in FIG. 11, generates a high output signifying the existence of the PIO condition, from about 0.7 to 1.8 seconds. As the PIO compensator 8 and pilot input modifier 11 function to modify the pilot control signal to eliminate the PIO condition, at about 1.8 seconds, the PIO condition starts to subside. By about 2.1 seconds, the PIO condition is eliminated and the aircraft is under the pilot's control with no aircraft damage or pilot injury suffered.

Figure 12:
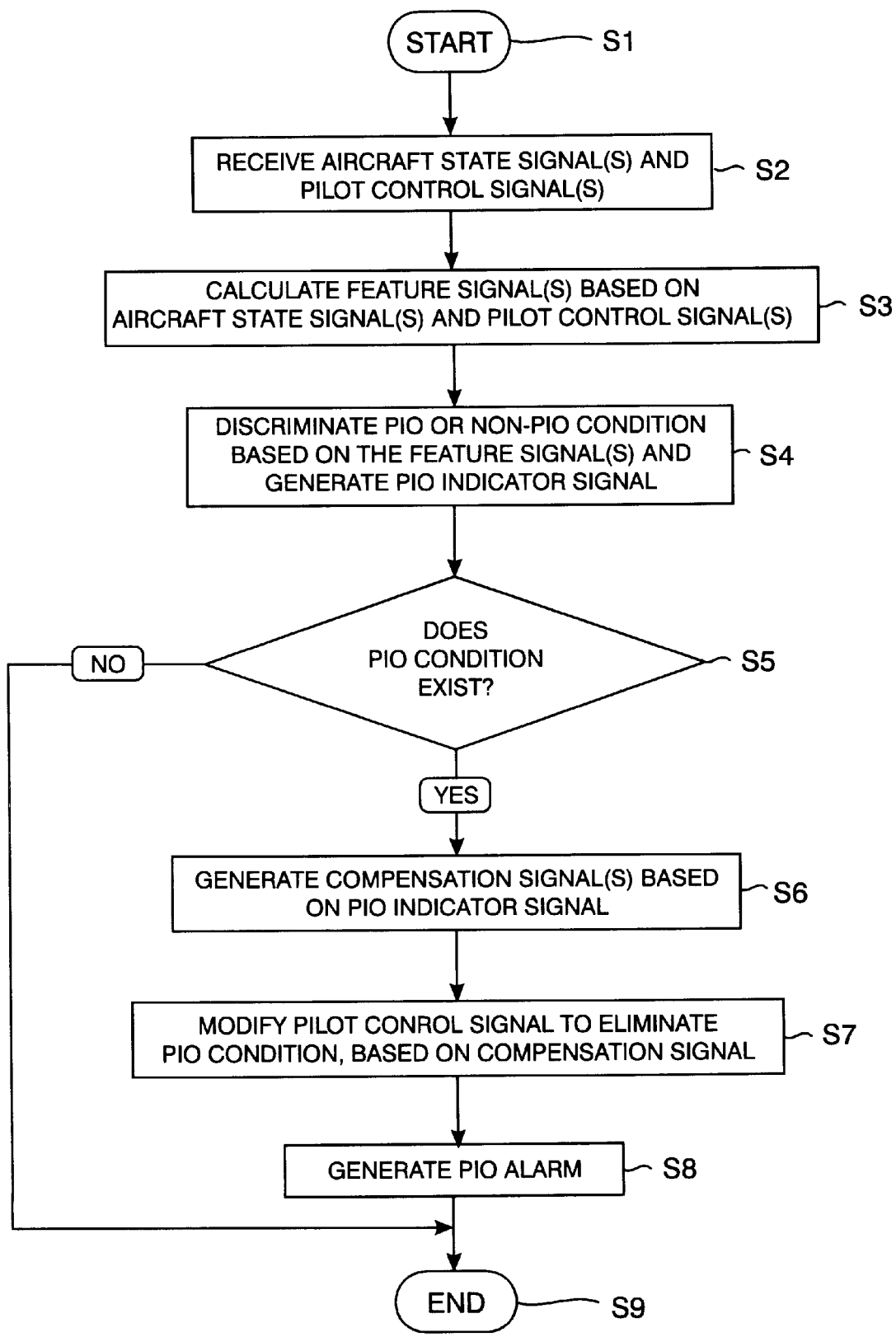
FIG. 12 is a flow chart of a method in accordance with this invention.

FIG. 12 is a flowchart of a method in accordance with this invention, for detecting and eliminating a PIO condition in an aircraft. The method parallels, and thus describes, the operation of the invented apparatus. In step S1 of FIG. 12, the method begins. In step S2, aircraft state signal and pilot control signals are received, by sampling the outputs of the aircraft's sensor(s) and the pilot's control instruments, for example, at time increments $\Delta t$, preferably of 0.1 second or smaller duration. The samples of the aircraft state signal(s) and the pilot control signal(s) are received by the PIO detector 8. In step S3, a feature signal(s) indicative of the presence or absence of a PIO condition are calculated based on the aircraft state signal and the pilot control signal. More specifically, the PIO detector 8 calculates the changes in the aircraft state signal $\Delta\theta$, $\Delta\phi$, $\Delta\psi$ over time intervals $\Delta t$, and filters the changes in aircraft state signal $\Delta\theta$, $\Delta\phi$ or $\Delta\psi$, to attenuate frequency components below 0.2 Hertz or above 3.0 Hertz at which a PIO is not likely to occur. The absolute values of the changes in aircraft state signal $\Delta\theta$, $\Delta\phi$ or $\Delta\psi$ are summed by the PIO detector 8 over a predetermined time interval, preferably 2.0 seconds, including a predetermined number of time increments $\Delta t$, to produce the first feature signal. In step S3, a second feature signal is calculated by the PIO detector 8 preferably by counting the number of sign changes occurring in the changes of the aircraft state signal $\Delta\theta$, $\Delta\phi$ or $\Delta\psi$ during a predetermined time interval or for a predetermined number of time increments $\Delta t$, for example, of 2.0 seconds duration. The counted number of sign changes can be divided by twice the predetermined time interval to yield a frequency for the change in the aircraft state signal $\Delta\theta$, $\Delta\phi$ or $\Delta\psi$ to be used as the second feature signal. Alternatively, if the predetermined time interval or the time increment $\Delta t$ is fixed, the counted number of sign changes can be used for the second feature signal.

A third feature signal is determined by the PIO detector 8 by calculating and summing absolute values of respective changes $\Delta F_x$ or $\Delta\delta_x$, $\Delta\Delta F_y$ or $\Delta\delta_y$, or $\Delta\delta_r$ occurring over respective time increments $\Delta t$, for a predetermined time interval of, for example, 2.0 seconds. The resulting sum is output from the PIO detector 8 as the third feature signal. A fourth feature signal is calculated by the PIO detector 8 by counting the number of sign changes occurring in the change signal $\Delta F_x$ or $\Delta\delta_x$, $\Delta F_y$ or $\Delta\delta_y$, or $\Delta\delta_r$ over a predetermined time interval or, equivalently, for a predetermined number of time increments $\Delta t$. The counted number of sign changes can be divided by twice the predetermined time interval or number of time increments $\Delta t$, to determine the frequency of the change signal $\Delta F_x$ or $\Delta\delta_x$, $\Delta F_y$ or $\Delta\delta_y$, or $\Delta\delta_r$ in Hertz units. Alternatively, if the predetermined time interval is fixed or the predetermined number of time increments $\Delta t$ is fixed, the counted number of sign changes occurring in the change signal $\Delta F_x$ or $\Delta\delta_x$, $\Delta F_y$ or $\Delta\delta_y$, or $\Delta\delta_r$ can be used as the fourth feature signal generated by the PIO detector 8.

In step S3, the fifth feature signal is calculated by the PIO detector 8 using the determined products of the signum of the change in aircraft state signal $\Delta\theta$, $\Delta\phi$ or $\Delta\psi$ and the signum of the change in the pilot control signal $\Delta F_x$ or $\Delta\delta_x$, $\Delta F_y$ or $\Delta\delta_y$, or $\Delta\delta_r$ for respective time increments $\Delta t$, and summing the products over a predetermined time interval or, equivalently, over a predetermined number of time increments $\Delta t$. The resulting sum of the products is the fifth feature signal generated by the PIO detector 8.

Alternatively, in step S3 of FIG. 12, in accordance with the second embodiment of the feature calculator, the aircraft state signal $\theta$, $\phi$, $\psi$ and the pilot control signal $F_x$ or $\delta_x$, $F_y$ or $\delta_y$, and/or $\delta_r$ are sampled at time increments $\Delta t$. The samples are preferably obtained by the processor of the feature calculator 13 and stored in the feature calculator's memory. After a predetermined number or window of samples have been obtained for each of the aircraft state signal and the pilot control signal, the processor multiplies the sample windows for the aircraft state signal $\theta$, $\phi$, $\psi$ and the pilot control signal $F_x$ or $\delta_x$, $F_y$ or $\delta_y$, and/or $\delta_r$ by respective Kaiser windows to condition the samples. The processor then performs FFTs on the window of samples of the aircraft state signal(s) $\theta$, $\phi$, $\psi$ and the pilot control signal(s) $F_x$ or $\delta_x$, $F_y$ or $\delta_y$, and/or $\delta_r$, and determines a predetermined number of maxima of the magnitudes of the complex values of the frequency-domain representations of the aircraft state signal(s) and the pilot control signal(s). The processor determines whether any of the maxima of the aircraft state signal(s) and the pilot control signal(s) occur at similar frequencies. If not, the processor outputs a feature signal(s) indicating that no PIO condition exists. On the other hand, if one or more maximum values of the aircraft state signal(s) occur at a similar frequency as a maximum value of the pilot control signal(s), the processor determines which of the maxima pairs have the largest phase difference, and outputs the magnitudes of the maximum values of the aircraft state signal and the pilot control signal, the average frequency of the maximum values of the aircraft state signal and the pilot control signal, and the phase difference between the maximum values of the aircraft state signal and the pilot control signal, as feature signals that are used by the discriminator to generate the PIO indicator signal that is output from the PIO detector 8 to the PIO compensator 9.

Alternatively, in step S3 of FIG. 12, in accordance with the third embodiment of the feature calculator, the feature calculator is preprogrammed with a polynomial and equations relating the coefficients of the polynomial to the phase and frequency of the aircraft state signal $\theta$, $\phi$, $\psi$ and the pilot control signal $F_x$ or $\delta_x$, $F_y$ or $\delta_y$, and/or $\delta_r$. The aircraft state signal and the pilot control signal are sampled at time increments $\Delta t$. The samples are preferably obtained by the processor of the feature calculator 13 and stored in the feature calculator's memory. After a predetermined number or window of samples have been obtained for each of the aircraft state signal and the pilot control signal, the amplitude(s) of the aircraft state signal(s) $\theta$, $\phi$, $\psi$ are determined and normalized by dividing the samples by respective amplitude(s). The polynomial is fit to the aircraft state signal to determine its coefficients that are related by the equations to the frequency and phase of the aircraft state signal. The feature calculator solves the equations using the determined polynomial coefficients, to determine the frequency and phase of the aircraft state signal. The feature calculator determines the amplitude of the pilot control signal over a time window, and normalizes the samples by dividing by the amplitude. The feature calculator fits the polynomial to the pilot control signal to determine its coefficients, and uses the equations and the determined polynomial coefficients to solve for the phase and frequency of the pilot control signal. The feature calculator averages the frequencies of the aircraft state signal and pilot control signal, subtracts the phases of the aircraft state signal and the pilot control signal, and outputs the average frequency, phase difference and amplitudes of the aircraft state signal and the pilot control signal, as feature signals.

Alternatively, in step S3 of FIG. 12, in accordance with the fourth embodiment of the feature calculator, the feature calculator is preprogrammed to perform an error function minimization technique, and with initial estimates of the amplitude, frequency and phase for the phase of the aircraft state signal θ, φ, ψ and the pilot control signal $F_x$ or $\delta_x$, $F_y$ or $\delta_y$, and/or $\delta_r$. The feature calculator receives samples of the aircraft state signal θ, φ, ψ and the pilot control signal $F_x$ or $\delta_x$, $F_y$ or $\delta_r$, and/or $\delta_r$. The aircraft state signal and the pilot control signal are sampled at time increments Δt. The samples are preferably obtained by the processor of the feature calculator 13 and stored in the feature-calculator's memory. After a predetermined number or window of samples have been obtained for each of the aircraft state signal and the pilot control signal, the feature calculator determines respective errors between sine functions defined by the estimates of the amplitude, frequency and phase of the aircraft state signal and the pilot control signal, and respective samples of the aircraft state signal. If the error is below a predetermined level or if a predetermined number of technique iterations have been performed, the feature calculator designates the amplitude, frequency and phase sets that generate the smallest errors as the solution sets for the aircraft state signal and the pilot control signal. On the other hand, if the error is not below the predetermined level or if the predetermined number of technique iterations has not been performed, the feature calculator modifies the estimates of the amplitude, frequency and phase for the aircraft state signal and the pilot control signal using the error minimization technique, to generate estimates for the next iteration. The feature calculator uses the solution sets to calculate the average frequency of the aircraft state signal and the pilot control signal, and outputs the average frequency, phase difference and amplitudes of the aircraft state signals as feature signals.

In step S4 of FIG. 12, a discrimination is performed to determine whether a PIO or non-PIO condition exists, based on the PIO indicator signal. The step S4 can be performed by supplying at least one, and preferably all, of the feature signals for one of the two alternative feature representations described above, to the discriminator 14 that includes a neural network trained to discriminate PIO and non-PIO conditions. Based on the feature signal(s), the discriminator generates a PIO indicator signal indicative of whether a PIO condition exists in the aircraft's pitch, roll or yaw attitudes θ, φ, ψ. In step S5, a determination is performed to establish whether a PIO condition exists. Preferably, the determination of whether a PIO condition exists is made by the PIO compensator 9 through control of the state of the switch 26. If the PIO condition exists, processing proceeds to step S6 in which compensation signal is generated based on the PIO indicator signal. More specifically, the PIO indicator signal is integrated over a predetermined time interval (preferably 2.0 seconds) to generate the compensation signal output by the PIO compensator. In step S7, the pilot control signal is modified, based on the compensation signal and the pilot control signal, preferably using the pilot input modifier 11. Such pilot control signal modification can include gain attenuation over a relatively narrow window or a broad range of frequencies, or phase shifting, of the pilot control signal to eliminate the PIO condition. The modified pilot control signal is used to control the aircraft actuator(s) 7 to eliminate the PIO condition and bring the aircraft back under the pilot's control. In step S8, to alert the pilot that the pilot's control actions are causing a PIO condition, the PIO alarm 10 is activated as long as the PIO condition persists. After the performance of step S8, or if the determination in step S5 is negative, the method terminates in step S9 of FIG. 12. Preferably, the method of FIG. 12 is performed once per time increment Δt during operation of the aircraft.

The many features and advantages of the present invention are apparent from the detailed specification and thus, it is intended by the appended claims to cover all such features and advantages of the described apparatus and methods which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

We claim:

1. A method comprising the steps of:
    a) generating a pilot-induced oscillation (PIO) indicator signal indicative of whether a PIO condition exists in an aircraft, based on an aircraft state signal and a pilot control signal.

2. A method as claimed in claim 1, wherein the aircraft state signal is indicative of at least one of the pitch, roll and yaw attitudes of the aircraft.

3. A method as claimed in claim 1, wherein the pilot generates the pilot control signal by operating at least one control instrument.

4. A method as claimed in claim 1, wherein said step (a) includes the substeps of:
    a1) calculating at least one feature signal indicative of a PIO condition, based on the aircraft state signal and the pilot control signal; and
    a2) generating the PIO indicator signal based on the feature signal.

5. A method as claimed in claim 4, wherein the substep (a1) includes the substeps of:
    i) determining changes in the aircraft state signal over respective predetermined time increments;
    ii) determining changes in the pilot control signal over the respective predetermined time increments;
    iii) generating a multiplication product signal based on the changes determined in the substep (i) and the changes determined in the substep (ii) for respective time increments; and
    iv) summing the product signal determined in the substep (iii) over a predetermined time interval, to generate a sum signal, the feature signal including the sum signal.

6. A method as claimed in claim 5, wherein the substep (a1) further comprises the substeps of:
    v) determining signums of the changes determined in the substep (i); and
    vi) determining signums of the changes determined in the substep (ii);
wherein the substep (iii) is performed by multiplying respective signums determined in said substeps (v) and (vi), to generate the product signal.

7. A method as claimed in claim 5, wherein the substep (i) further comprises the substeps of:
    v) filtering the changes determined in the substep (i) before performing the substep (iii); and
    vi) filtering the changes determined in the substep (ii) before performing the substep (iii).

8. A method as claimed in claim 4, wherein the substep (a1) includes the substeps of:
    i) determining changes in the aircraft state signal over respective predetermined time increments; and
    ii) summing the changes over a predetermined time interval, to generate a sum signal, the feature signal including the sum signal.

9. A method as claimed in claim 4, wherein the substep (a1) includes the substeps of:

i) determining changes in the aircraft state signal over respective predetermined time increments;

ii) estimating a frequency of the aircraft state signal, based on the changes determined in the substep (i), the feature signal including the estimated frequency.

10. A method as claimed in claim 4, wherein the substep (a1) includes the substeps of:

i) determining changes in the pilot control signal over respective predetermined time increments;

ii) summing the changes over a predetermined time interval, to generate a sum signal, the feature signal including the sum signal.

11. A method as claimed in claim 4, wherein the substep (a1) includes the substeps of:

i) determining changes in the aircraft state signal over respective predetermined time increments; and ii) estimating a frequency of the aircraft state signal, based on the changes determined in the substep (i), the feature signal including the estimated frequency.

12. A method as claimed in claim 4, wherein the substep (a1) includes the substeps of:

i) sampling the aircraft state signal and the pilot control signal;

ii) performing fast Fourier transforms (FFTs) on the sampled aircraft state signal and pilot control signal;

iii) determining whether maxima in magnitudes of the complex values of the frequency components generated by the FFTs of the aircraft state signal and pilot control signal occur at similar frequencies;

iv) determining from among the pairs of maxima of the FFTs of the aircraft state signal and pilot control signal determined in the substep (iii) the maxima pair that has the largest phase difference, based on the FFTs of the aircraft state signal and the pilot control signal; and v) calculating an average frequency for the maxima pair, based on the FFTs of the aircraft state signal and the pilot control signal, the feature signal including the magnitudes, the phase difference and the average frequency of the maxima pair with the largest phase difference.

13. A method as claimed in claim 4, wherein the substep (a1) comprises the substeps of:

i) determining a polynomial to approximate the aircraft state signal;

ii) fitting the polynomial to the aircraft state signal;

iii) determining expressions for frequency and phase of the aircraft state signal based on a Fourier series expansion;

iv) relating the coefficients of the polynomial to respective expressions for the frequency and phase determined in said substep (iii); and v) determining the frequency and phase of the aircraft state signal, based on the substep (iv), wherein the feature signal is calculated based on the frequency and phase determined in said step (v).

14. A method as claimed in claim 4, wherein the substep (a1) comprises the substeps of:

i) determining a polynomial to approximate the pilot control signal;

ii) fitting the polynomial to the pilot control signal;

iii) determining expressions for frequency and phase of the pilot control signal based on a Fourier series expansion;

iv) relating the coefficients of the polynomial to respective expressions for the frequency and phase determined in said substep (iii);

v) determining the frequency and phase of the pilot control signal, based on the substep (iv), wherein at least one feature signal is calculated based on the frequency and phase determined in said step (v).

15. A method as claimed in claim 4, wherein said step (a1) includes substeps of:

i) determining solution sets of amplitude, frequency and phase for the aircraft state signal and the pilot control signal, based on a predetermined error function minimization technique, wherein at least one feature signal is generated based on the solution sets.

16. A method as claimed in claim 15, wherein the predetermined error function minimization technique is a simplex method, and wherein the error function is a squared error function based on sets of estimates of the amplitude, frequency and phase of the aircraft state signal and the pilot control signal, and samples of the aircraft state signal and pilot control signal, over a predetermined time window.

17. A method as claimed in claim 4, wherein the substep (a2) includes a substep of supplying the feature signal to a discriminator that implements a discrimination function that generates the PIO indicator signal based on the feature signal.

18. A method as claimed in claim 17, further comprising the substep of:

a3) before performing the substeps (a1) and (a2), determining the discrimination function based on the feature signals calculated with actual data from an in-flight recording of a PIO condition, and a predetermination as to whether or not the feature signals calculated correspond to a PIO or a non-PIO condition.

19. A method as claimed in claim 17, further comprising the substep of:

a3) before performing the substeps (a1) and (a2), determining the discrimination function based on the feature signals calculated with data from a simulated PIO condition, and a predetermination as to whether or not the feature signals calculated with the data correspond to a PIO or a non-PIO condition.

20. A method as claimed in claim 4, wherein the feature signal includes frequency information indicative of whether or not a PIO condition exists in the aircraft.

21. A method as claimed in claim 1, wherein said step (a) includes the substep of:

a1) supplying at least one feature signal determined based on the aircraft state signal and pilot control signal, to a discriminator to generate the PIO indicator signal.

22. A method as claimed in claim 21, wherein the discriminator uses a discrimination function that maps at least one value of a respective feature signal to a corresponding value of the PIO indicator signal that is indicative of a likelihood that a PIO condition exists in the aircraft.

23. A method as claimed in claim 22, wherein the discriminator includes a neural network, the method further comprising the substep of:

a2) before performing the substep (a1), training the neural network with at least one set of predetermined aircraft state and pilot control signals, and a corresponding predetermined PIO indicator signal.

24. A method as claimed in claim 23, wherein the predetermined aircraft state and pilot control signals are generated from actual or simulated PIO data, and the predetermined PIO indicator signal is based upon an estimate of whether a PIO condition exists based on the actual or simulated PIO data.

25. A method as claimed in claim 1, wherein said step (a) includes a substep of a1) calculating at least one feature signal as a spectral quantity of at least one of the aircraft state signal and the pilot control signal, including phase, amplitude, frequency, average frequency of the aircraft state signal and pilot control signal, and phase difference between the aircraft state signal and the pilot control signal, the PIO indicator signal generated based on the feature signal.

26. A method as claimed in claim 1, further comprising the step of:

b) generating an alarm, based on the PIO indicator signal.

27. A method as claimed in claim 1, further comprising the steps of:

b) generating a compensation signal, based on the PIO indicator signal; and c) modifying the pilot control signal, based on the compensation signal.

28. A method as claimed in claim 27, wherein said step (c) includes modifying gain or phase of at least one frequency component of the pilot control signal supplied to the aircraft's flight control system to reduce the PIO condition, based on the compensation signal.

29. A method as claimed in claim 27, wherein said step (c) includes notch filtering the pilot control signal to modify the gain or phase of the pilot control signal.

30. A method as claimed in claim 1, wherein said step (a) includes substeps of:

a1) determining a change in the aircraft state signal, and a2) determining a change in the pilot control signal, the PIO indicator signal generated in said step (a) based on the changes determined in the substeps (a1) and (a2).

31. An apparatus for use with an aircraft, the apparatus receiving an aircraft state signal and a pilot control signal, the apparatus comprising:

a pilot-induced oscillation (PIO) detector coupled to receive the aircraft state signal and the pilot control signal, and generating pilot-induced oscillation (PIO) indicator signal indicative of whether a PIO condition exists in the aircraft, based on the aircraft state signal and the pilot control signal.

32. An apparatus as claimed in claim 31, further comprising:

at least one sensor coupled to the PIO detector and the aircraft, and generating the aircraft state signal that is indicative of at least one of the pitch, roll and yaw attitudes of the aircraft.

33. A method as claimed in claim 31, further comprising:

at least one control instrument coupled to the PIO detector, the pilot generating the pilot control signal by operating the control instrument to fly the aircraft.

34. An apparatus as claimed in claim 31, wherein the PIO detector includes a first differentiator coupled to receive the aircraft state signal, and generating a first change signal for the aircraft state signal over a predetermined time increment, based on the aircraft state signal;

a second differentiator coupled to receive the pilot control signal, and generating a second change signal for the pilot control signal over the predetermined time increment, based on the pilot control signal, the PIO indicator signal generated by the PIO detector based on the first and second change signals.

35. An apparatus as claimed in claim 34, wherein the PIO detector further includes a first filter coupled to receive the first change signal, and filtering the first change signal to generate a filtered first change signal; and a second filter coupled to receive the second change signal, and filtering the second change signal to generate a filtered second change signal, the PIO indicator signal generated by the PIO detector based on the filtered first and second change signals.

36. An apparatus as claimed in claim 34, wherein the first and second differentiators generate first and second change signals for a plurality of time increments, the PIO detector further including a signum-multiplier-summer unit coupled to receive the first and second change signals for a plurality of time increments occurring in a predetermined time interval, performing signum operations on respective first and second change signals, and generating a sum signal by summing the products of the signum operations for respective time increments over the predetermined time interval, and a discriminator coupled to receive the sum signal, and generating the PIO indicator signal based on the sum signal.

37. An apparatus as claimed in claim 31, wherein the PIO detector includes a differentiator coupled to receive the aircraft state signal, and generating a change signal for the aircraft state signal over respective predetermined time increments, based on the aircraft state signal;

a summer coupled to receive the change signal, and summing the change signal over a predetermined time interval, to generate sum signal based on the change signal; and a discriminator coupled to receive the sum signal, and generating the PIO indicator signal based on the sum signal.

38. An apparatus as claimed in claim 31, wherein the PIO detector includes a differentiator coupled to receive the aircraft state signal, and generating a change signal for the aircraft state signal over respective predetermined time increments, based on the aircraft state signal;

a frequency estimator coupled to receive the change signal, and generating frequency estimate signal for the aircraft state signal, based on the change signal; and a discriminator coupled to receive the frequency estimate signal, and generating the PIO indicator signal based on the frequency estimate signal.

39. An apparatus as claimed in claim 31, wherein the PIO detector includes a differentiator coupled to receive the pilot control signal, and generating change signal for the pilot control signal over respective predetermined time increments, based on the pilot control signal;

a summer coupled to receive the change signal, and summing the change signal over a predetermined time interval, to generate sum signal based on the change signal; and a discriminator coupled to receive the sum signal, and generating the PIO indicator signal based on the sum signal.

40. An apparatus as claimed in claim 31, wherein the PIO detector includes a differentiator coupled to receive the pilot control signal, and generating change signal for the pilot control signal over respective predetermined time increments, based on the pilot control signal;

a frequency estimator coupled to receive the change signal, and generating a frequency estimate signal for the pilot control signal, based on the change signal; and a discriminator coupled to receive the frequency estimate signal, and generating the PIO indicator signal based on the frequency estimate signal.

41. An apparatus as claimed in claim 31, wherein the PIO detector includes a feature calculator coupled to receive the aircraft state signal and the pilot control signal, and generating at least one feature signal based on the aircraft state signal and the pilot control signal; and a discriminator coupled to receive the feature signal, and generating the PIO indicator signal based on the feature signal.

42. An apparatus as claimed in claim 41, wherein the feature calculator includes a processor coupled to receive the aircraft state signal and the pilot control signal, and performing fast Fourier transforms (FFTs) on the aircraft state signal and the pilot control signal to produce frequency-domain representations of the aircraft state signal and the pilot control signal, the processor determining a predetermined number of maxima of frequency components of the frequency-domain representations having the largest magnitudes, and determining the maxima of the frequency-domain representation of the aircraft state signal and the maxima of the frequency-domain representation of the aircraft state signal that occur at similar frequencies with the largest phase difference, the processor outputting magnitudes, average frequency and phase difference of the maxima having similar frequencies with the largest phase difference, as feature signals supplied to the discriminator.

43. An apparatus as claimed in claim 41, wherein the feature calculator includes a processor coupled to receive the aircraft state signal and the pilot control signal, the processor determining amplitudes for the aircraft state signal and the pilot control signal, fitting respective predetermined polynomials to samples of the aircraft state signal and the pilot control signal to generate polynomial coefficients, determining the frequency and phase of the aircraft state signal and the pilot control signal based on the coefficients and a predetermined Fourier series expansion of a sine function, the processor determining the average frequency the aircraft state signal and the pilot control signal, the phase difference between the phases of the aircraft state signal and the pilot control signal, and the processor outputting the average frequency, the phase difference and the amplitudes of the phases of the aircraft state signal and the pilot control signal, as feature signals supplied to the discriminator.

44. An apparatus as claimed in claim 41, wherein the feature calculator includes a processor coupled to receive the aircraft state signal and the pilot control signal, the processor determining solution sets for the amplitude, frequency and phase of the aircraft state signal and the pilot control signal, by performing an iterative minimization technique upon error functions based on respective samples of the aircraft state signal and the pilot control signal, and respective sine functions defined by sets of estimates of the amplitude, frequency and phase of the aircraft state signal and the pilot control signal, that are generated through the performance of the minimization technique, the processor generating at least one feature signal based on the solution sets.

45. An apparatus as claimed in claim 44, wherein the minimization technique is a simplex method preprogrammed into the processor, and wherein the error function is a squared error between samples of the aircraft state signal and the pilot control signal, and respective sine functions defined by sets of estimates of the amplitude, frequency and phase of the aircraft state signal and the pilot control signal.

46. An apparatus as claimed in claim 41, wherein the feature signal includes at least one spectral component estimated in the time domain by fitting a sine function or a sum of sine functions to at least one of the aircraft state signal and the pilot control signal.

47. An apparatus as claimed in claim 41, wherein the feature signal is based on an approximating function for at least one of the aircraft state signal and the pilot control signal.

48. An apparatus as claimed in claim 47, wherein the approximating function includes at least one of a polynomial, a sine function and a Fourier series.

49. An apparatus as claimed in claim 31, further comprising:

a PIO compensator coupled to receive the PIO indicator signal, and generating compensation signal based on the PIO indicator signal; and a pilot input modifier coupled to the PIO compensator, and modifying gain or phase of the pilot control signal, based on the compensation signal.

50. An apparatus as claimed in claim 49, wherein the PIO compensator includes a switch having a first input terminal and a control terminal, the first input terminal coupled to receive a signal based on the PIO indicator signal;

an integrator coupled to an output terminal of the switch, for integrating the signal based on the PIO indicator signal over a predetermined time interval, to generate an integrated signal used to produce the compensation signal; and a scaler coupled to receive the integrated signal from the integrator, for scaling the integrated signal, and coupled to supply the scaled integrated signal to a second input terminal of the switch, the switch coupling the signal based on PIO indicator signal to the input of the integrator, and decoupling the output of the scaler from the input of the integrator, if the signal based on the PIO indicator signal is greater than or equal to a predetermined level, and the switch decoupling the signal based on the PIO indicator signal from the input of the integrator, and coupling the output of the scaler to the input of the integrator, if the signal based on the PIO indicator signal is less than the predetermined level.

51. An apparatus as claimed in claim 49, wherein the pilot input modifier includes a multiplier for multiplying the compensation signal and the pilot control signal, to generate a modified pilot control signal to control an aircraft actuator to eliminate a PIO condition in an aircraft.

52. An apparatus as claimed in claim 49, wherein the pilot input modifier includes a variable phase delay for variably delaying the pilot control signal, to generate a modified pilot control signal to control an aircraft actuator to eliminate a PIO condition in an aircraft.

53. An apparatus as claimed in claim 49, wherein at least one of the PIO detector, the PIO compensator and the pilot input modifier are implemented with at least one of a digital signal processor, a programmable logic array, a microcontroller, a look-up table, and a processor coupled to a memory.

54. An apparatus as claimed in claim 49, wherein at least one of the PIO detector, the PIO compensator and the pilot input modifier are implemented in a flight control system of the aircraft, the apparatus further comprising:

at least one actuator coupled to the aircraft and coupled to receive a flight control signal based on the modified pilot control signal, the actuator controlling at least one of the pitch, roll and yaw attitudes of the aircraft, based on the flight control signal derived from the modified pilot control signal.

\* \* \* \* \*

UNITED STATES PATENT AND TRADEMARK OFFICE
CERTIFICATE OF CORRECTION

PATENT NO. : 5935177
DATED : August 10, 1999
INVENTOR(S) : Chadwick J. Cox et al.

It is certified that error appears in the above-identified patent and that said Letters Patent is hereby corrected as shown below:

col. 26, line 11 (claim 1), change "steps" to --step--;

col. 30, line 53 (claim 39), change "change" to --a change--;

col. 30, line 67 (claim 40), change "change" to --a change--.

Signed and Sealed this

Twenty-second Day of February, 2000

Attest:

Q. TODD DICKINSON

Attesting Officer    Commissioner of Patents and Trademarks